(12) United States Patent
Lang et al.

(10) Patent No.: US 8,329,072 B2
(45) Date of Patent: Dec. 11, 2012

(54) METHOD AND SYSTEM FOR GENERATING SULFUR SEEDS AND GRANULES

(75) Inventors: Leslie L. Lang, Calgary (CA); Paul R. Larson, Calgary (CA); Jamsheed P. Irani, Calgary (CA); Sergio A. De Paoli, Calgary (CA); Casey J. Metheral, Calgary (CA)

(73) Assignee: Brimrock International Inc., Kilgore, TX (US)

( * ) Notice: Subject to any disclaimer, the term of this patent is extended or adjusted under 35 U.S.C. 154(b) by 0 days.

(21) Appl. No.: 12/953,512

(22) Filed: Nov. 24, 2010

(65) Prior Publication Data

US 2012/0126439 A1    May 24, 2012

(51) Int. Cl.
  *B29B 9/00*    (2006.01)
(52) U.S. Cl. ............... 264/7; 264/13; 425/7; 118/303
(58) Field of Classification Search .................. None
  See application file for complete search history.

(56) References Cited

U.S. PATENT DOCUMENTS

| | | | |
|---|---|---|---|
| 1,378,084 A * | 5/1921 | Bacon et al. ............... | 264/13 |
| 2,811,748 A | 11/1957 | Smith | |
| 2,923,033 A | 2/1960 | Baldwin et al. | |
| 3,060,510 A | 10/1962 | Fischer et al. | |
| 3,210,443 A | 10/1965 | Reddie et al. | |
| 3,334,159 A | 8/1967 | Campbell | |
| 3,348,938 A | 10/1967 | Sherrington et al. | |
| 3,398,458 A | 8/1968 | Quanquin et al. | |
| 3,446,877 A | 5/1969 | Endler | |
| 3,472,922 A | 10/1969 | Siegendorf et al. | |
| 3,538,200 A | 11/1970 | Hite | |

(Continued)

FOREIGN PATENT DOCUMENTS

WO    WO2009054906 A1    4/2009

(Continued)

OTHER PUBLICATIONS

PCT International Search Report, International Application No. PCT/US08/11799, mailing date Dec. 19, 2008 (2 pages).

(Continued)

*Primary Examiner* — Mary F Theisen
(74) *Attorney, Agent, or Firm* — Strasburger & Price, LLP

(57) ABSTRACT

Sulfur (or sulphur) spray nozzles disposed with a cooling tank spray liquid molten sulfur into the cooling liquid in the tank. Solid sulfur seeds are formed in the cooling liquid and settle in the tank. The cooling tank may be a spiral dewaterer tank that has a screw conveyor at the bottom of the tank that moves the seeds to a granulating drum for enlargement into sulfur granules. The cooling tank may also be used to capture and remove sulfur dust from a slurry of sulfur dust and water recycled from the granulating drum. The sulfur dust in the cooling tank may be captured by contact with molten sulfur droplets streaming down the cooling liquid column such that the dust particles become incorporated into the droplet, thereby being converted to seed. The granulating drum may be equipped with two or more sets of segmented lifting flights. The sets of flights may not be in alignment. The flights may be spaced apart from the inside surface of the drum with segmented rib members. The rib members may allow for the movement of sulfur seeds and granules between the flights and the inside surface of the drum as the drum rotates.

38 Claims, 13 Drawing Sheets

U.S. PATENT DOCUMENTS

| | | |
|---|---|---|
| 3,609,088 A | 9/1971 | Sumner |
| 3,646,689 A | 3/1972 | Kuchenthal et al. |
| 3,649,217 A | 3/1972 | Bailey |
| 3,689,226 A | 9/1972 | Stoddard |
| 3,836,611 A | 9/1974 | Mavrovic |
| 3,877,415 A | 4/1975 | Blouin |
| 3,888,956 A | 6/1975 | Klint |
| 3,903,333 A | 9/1975 | Shirley, Jr. et al. |
| 3,933,956 A | 1/1976 | Mavrovic |
| 3,975,472 A | 8/1976 | Packbier et al. |
| 3,991,225 A | 11/1976 | Blouin |
| 4,031,174 A | 6/1977 | Bennett |
| 4,043,717 A | 8/1977 | Riano |
| 4,056,340 A | 11/1977 | Yalkowsky |
| 4,081,500 A | 3/1978 | Malcolm |
| 4,082,823 A | 4/1978 | Augustine et al. |
| 4,102,968 A | 7/1978 | Caswell |
| 4,133,669 A | 1/1979 | Caldwell et al. |
| 4,149,837 A | 4/1979 | Baker et al. |
| 4,213,924 A | 7/1980 | Shirley, Jr. |
| 4,234,318 A | 11/1980 | Higgins et al. |
| 4,254,067 A | 3/1981 | Elliott |
| 4,263,012 A | 4/1981 | Leszczynska et al. |
| 4,272,234 A | 6/1981 | Tse |
| 4,305,913 A | 12/1981 | Anjier |
| 4,353,852 A | 10/1982 | Tse |
| 4,364,919 A | 12/1982 | Yamada et al. |
| 4,370,252 A | 1/1983 | Uraneck et al. |
| 4,389,356 A | 6/1983 | Higgins |
| 4,408,998 A | 10/1983 | Mutsers et al. |
| 4,424,176 A | 1/1984 | Shirley, Jr. et al. |
| 4,449,900 A | 5/1984 | Lerner |
| 4,507,335 A | 3/1985 | Mathur |
| 4,511,542 A | 4/1985 | Anjier et al. |
| 4,563,315 A | 1/1986 | Walter et al. |
| 4,569,859 A * | 2/1986 | Zaharko ............... 427/215 |
| 4,617,179 A | 10/1986 | Veyrier |
| 4,842,790 A * | 6/1989 | Nunnelly ............... 264/117 |
| 4,857,098 A | 8/1989 | Shirley, Jr. |
| 4,863,645 A * | 9/1989 | Harbolt et al. .......... 264/13 |
| 4,871,489 A | 10/1989 | Ketcham |
| 4,931,231 A * | 6/1990 | Teppo ................... 264/13 |
| 4,935,173 A | 6/1990 | Huey et al. |
| 4,944,769 A | 7/1990 | Garcia et al. |
| 4,966,736 A * | 10/1990 | Harbolt et al. .......... 264/11 |
| 4,986,941 A | 1/1991 | Hendrix et al. |
| 5,006,369 A | 4/1991 | Shirtum |
| 5,030,437 A | 7/1991 | Mahadev et al. |
| 5,071,332 A | 12/1991 | Garcia et al. |
| 5,096,571 A | 3/1992 | Womack et al. |
| 5,102,586 A | 4/1992 | Fuji et al. |
| 5,205,958 A | 4/1993 | Swatling et al. |
| 5,236,466 A | 8/1993 | Lauterbach |
| 5,401,445 A * | 3/1995 | Menchhofer ............ 264/13 |
| 5,435,945 A * | 7/1995 | De Paoli et al. ........ 264/7 |
| 5,437,691 A | 8/1995 | Lauterbach |
| 5,460,765 A | 10/1995 | Derdall et al. |
| 5,514,307 A | 5/1996 | Shirley, Jr. et al. |
| 5,558,821 A | 9/1996 | Konig |
| 5,571,303 A | 11/1996 | Bexton |
| 5,599,374 A | 2/1997 | Detrick |
| 5,628,937 A | 5/1997 | Oliver et al. |
| 5,664,422 A | 9/1997 | Jones |
| 5,691,297 A | 11/1997 | Nassano et al. |
| 5,766,521 A | 6/1998 | Le Thiesse et al. |
| 5,770,235 A | 6/1998 | Baumann et al. |
| 5,779,945 A | 7/1998 | Nijsten et al. |
| 5,788,896 A * | 8/1998 | Bertram et al. .......... 264/8 |
| 5,975,442 A | 11/1999 | Purser |
| 6,162,377 A | 12/2000 | Ghosh et al. |
| 6,168,733 B1 | 1/2001 | Naylor et al. |
| 6,203,730 B1 | 3/2001 | Honda et al. |
| 6,331,245 B1 | 12/2001 | Moretta et al. |
| 6,398,989 B1 | 6/2002 | Bergstrom |
| 6,432,330 B1 | 8/2002 | Hanabe et al. |
| 6,440,336 B1 | 8/2002 | Weinreich et al. |
| 6,499,979 B2 | 12/2002 | Northup, Jr. et al. |
| 6,579,479 B1 | 6/2003 | Edie et al. |
| 6,749,659 B1 | 6/2004 | Yu et al. |
| 6,790,418 B2 | 9/2004 | Young et al. |
| 7,033,556 B1 | 4/2006 | Squires |
| 7,208,107 B2 | 4/2007 | Jurgens et al. |
| 7,343,697 B2 | 3/2008 | Dillman |
| 7,413,690 B1 | 8/2008 | Cheboyina et al. |
| 7,638,076 B2 * | 12/2009 | Koten ................... 264/13 |
| 2002/0056931 A1 | 5/2002 | Zardi et al. |
| 2002/0063351 A1 | 5/2002 | Hanabe et al. |
| 2002/0102310 A1 | 8/2002 | Vanzin |
| 2004/0088830 A1 | 5/2004 | Mennen |
| 2004/0163434 A1 | 8/2004 | Quin |
| 2006/0010708 A1 | 1/2006 | Carin et al. |
| 2008/0029924 A1 | 2/2008 | Maezawa et al. |
| 2008/0107902 A1 | 5/2008 | Kinuta et al. |
| 2008/0272508 A1 | 11/2008 | Culbert et al. |
| 2009/0035579 A1 | 2/2009 | Coufal et al. |
| 2009/0215000 A1 | 8/2009 | Boots et al. |
| 2010/0233332 A1 | 9/2010 | Xing et al. |

FOREIGN PATENT DOCUMENTS

| | | |
|---|---|---|
| WO | WO2009074250 A2 | 6/2009 |
| WO | WO2009155682 A1 | 12/2009 |
| WO | WO2010086395 A1 | 8/2010 |
| WO | WO2010090518 A2 | 8/2010 |
| WO | WO2010107401 A2 | 9/2010 |

OTHER PUBLICATIONS

PCT Written Opinion of the International Searching Authority, International Application No. PCT/US08/11799, mailing date Dec. 19, 2008 (5 pages).

PCT Intenatonal Peliminay Repor on Patentability (chaper II of the Patent Cooperton Teaty) International Application No. PCT/US08/11799, mailing date Aug. 11, 2009 (8 pages).

* cited by examiner

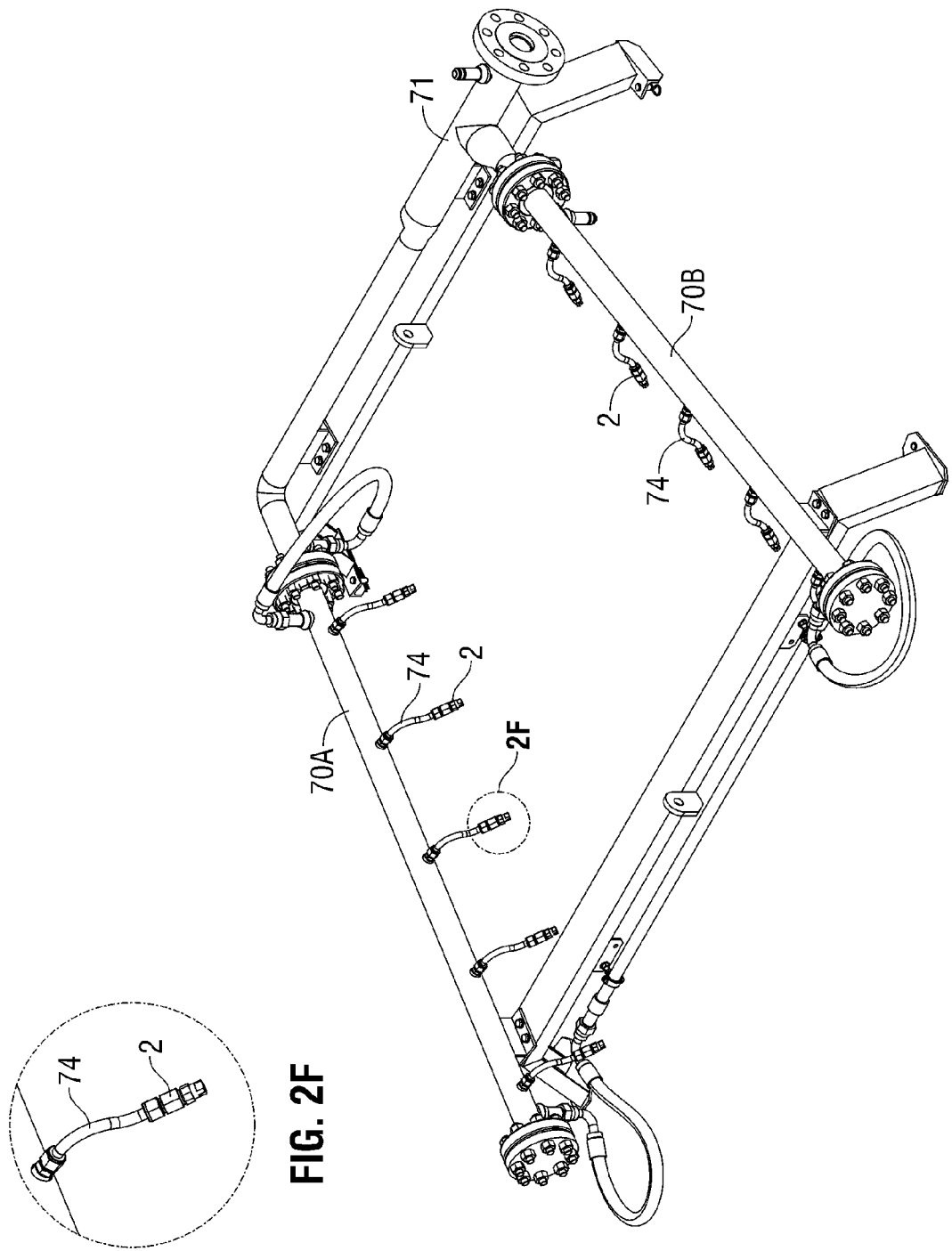

METHOD AND SYSTEM FOR GENERATING SULFUR SEEDS AND GRANULES

CROSS-REFERENCE TO RELATED APPLICATIONS

N/A

STATEMENT REGARDING FEDERALLY SPONSORED RESEARCH OR DEVELOPMENT

N/A

REFERENCE TO MICROFICHE APPENDIX

N/A

BACKGROUND OF THE INVENTION

1. Field of the Invention

This invention relates to the field of converting molten sulfur (or sulphur) into solid sulfur granules using sulfur seeds.

2. Description of the Related Art

Sulfur is an important industrial commodity, most commonly produced in molten liquid form as a byproduct from oil and gas refining. Much of the liquid sulfur is solidified into various "forms," such as granules, pastilles or prills for ease in transportation and use. The various forms are commercially produced by different processes. Granules are produced by enlarging "seeds" in a granulating drum; pastilles are formed by laying sulfur drops onto a continuous stainless steel belt; and prills are produced by dropping liquid sulfur into a bath of cooling water. Whereas pastilles and prills are produced by solidifying single sulfur droplets, the production of granules requires a "seed" particle to initiate the enlargement process.

A criteria for evaluating sulfur product was established by the Sulphur Development Institute of Canada (SUDIC). The shape and particle size distribution of sulfur forms under the criteria is generally spherical with the diameter between 2 mm to 6 mm. Sulfur forms qualify as "premium product" or "standard product" depending on shape, particle size distribution, moisture content, and friability. Sulfur granules and pastilles meet the premium product specification in all respects. Wet prills do not meet the premium product specification with respect to moisture, and are considered "standard product." A sulfur seed is understood in the industry to be a sulfur particle that requires further enlargement to become a sulfur granule and obtain maximum commercial value. A sulfur seed is generally considered to be smaller than 2 mm in diameter.

The three commercial forming processes also differ in the manner in which heat is removed to effect sulfur fusion and cooling of solid particles. In drum granulation, sulfur is cooled by transferring heat to the atmosphere inside the drum, the temperature of which is moderated by evaporation of water droplets sprayed into the drum. Pastilles are cooled by spraying water to the underside of the stainless steel belt, which in turn is cooled by evaporation in a cooling tower. Wet prills are cooled by transferring heat to the water bath which in turn is cooled by evaporation in a cooling tower.

U.S. Pat. No. 4,213,924 (Shirley) proposes a method for producing sulfur granules in a rotary drum having lifting flights to elevate the seeds that then fall from the flights as curtains which are then coated with a spray of liquid sulfur. The discharged product from the drum is screened, and seeds that have not been adequately enlarged are returned on conveyors and either cooled or heated before being recycled into the input end of the drum. The '924 Shirley patent also proposes crushing oversized product discharged from the granulating drum and recycling the crushings to the drum as seed or recycle material. A disadvantage with crushing is that dust is created that may become released into the environment. The dust may be explosive and/or a health hazard. Also, the crushings are not uniform in size or spherical in shape.

In the past, fans have been proposed to force circulation of air through the falling curtains for enhanced cooling. A cooler sulfur product tends to be less friable and less susceptible to "caking" or "agglomerating" in storage. However, the fans may become unbalanced from the sulfur that accumulates on the blades.

U.S. Pat. No. 4,272,234 (Tse) proposes the production of sulfur seeds in a granulating drum by raising the temperature of the rotating bed of sulfur particles for a short period of time. The sulfur sprayed on the falling particles in a particular zone of the drum is proposed to not immediately solidify but remain soft or plastic on the particles' surface, and when the particles are tumbled in the bed, the abrading action of the other particles are proposed to break off small pieces of the soft coating having a diameter in the range of about 0.1 to about 1.0 mm.

U.S. Pat. No. 4,507,335 (Mathur) proposes the generation of sulfur seed particles inside a granulating drum in certain controlled conditions in which liquid sulfur droplets found in the outer edges of a thin, flat spray plume solidify into seeds prior to contacting the falling curtain of solid sulfur particles. U.S. Pat. No. 5,435,945 (De Paoli et al.) proposes creating sulfur seeds within a granulating drum by intersecting the molten sulfur spray with a water spray or by creating a spray of sulfur droplets that are allowed to solidify in the atmosphere within the granulating drum.

A disadvantage of producing seeds in a granule enlargement drum is that the conditions required in the drum for optimum granule production are not the same conditions required for optimum seed production. It generally takes a skilled technician to monitor and operate the system.

U.S. Pat. No. 7,638,076 (Koten) proposes inter alia, passing molten sulfur through a nested strainer, a drip tray with a heating channel, an injection conduit for delivery of a cooled zone of water to create solid prills, and thereafter moving the prills through a stationary curved screen and a vibrating screen.

A need exists for a method and system to more efficiently create sulfur seeds to be used for enlargement into sulfur granules. It would be desirable to control the size distribution and production rate of seeds in a manner that corresponds directly to enlargement requirements to enable sulfur granules to be produced in a one pass continuous enlargement process through a granulating drum at a reasonably high production rate, thereby substantially eliminating the need for screening the drum output and recycling undersized product with conveyors back to the drum input end. A need also exists to improve the rate at which granules are cooled in the drum in order to realize improved product quality and higher production rates.

BRIEF SUMMARY OF THE INVENTION

Sulfur seeds may be produced by positioning sulfur spray nozzles over a cooling or forming tank where the nozzles spray liquid molten sulfur into a cooling liquid in the cooling tank, such as water. Solid sulfur seeds are formed in the liquid as the liquid sulfur droplets solidify and settle in the tank. The sulfur seeds may be generally spherical in shape. The cooling tank may be a spiral dewaterer tank with an angled bottom and a screw conveyor, in which instance the screw conveyor may transport the seeds from the bottom of the tank to a granulating drum used to enlarge the seeds into sulfur granules. In other embodiments, a conveyor belt or a drag chain or other mechanism may transport the seeds to the enlargement drum. The cooling tank may also be used to capture and remove sulfur dust from a slurry of sulfur dust and water recycled from the granulating drum. The sulfur dust in the cooling tank may be captured by contact with molten sulfur droplets streaming down the cooling liquid column such that the dust particles become incorporated into the droplet, thereby being converted to a substantially spherical seed.

A one pass enlargement process may be enabled through the granulating drum, eliminating a screen and recycle conveyor, thereby allowing the system to be supported on transportable structures or skids. The process allows for dynamic changes to flow rates, temperatures and pressures to increase or decrease granule production without having to take the system off line. The granulating drum may be equipped with two or more sets of segmented lifting flights. The sets of lifting flights may not be aligned. The lifting flights may have different heights. The lifting flights may be disposed with the inside surface of the drum on lines not parallel with the longitudinal centerline or rotational axis of the drum (creating an overall screw effect), allowing for the sulfur bed to move to the discharge end at a progressively faster rate.

The lifting flights may be attached with rib members that are disposed between the lifting flights and the inside surface of the drum. The thicknesses of the rib members allow for the spacing apart of the flights from the inside surface of the drum, and the movement of the larger sulfur seeds between the flights and the inside surface of the drum as the drum rotates so that their exposure to the enlarging sulfur spray may be minimized.

BRIEF DESCRIPTION OF THE DRAWINGS

A better understanding can be obtained with the following detailed descriptions of the various disclosed embodiments in the drawings, which are given by way of illustration only, and thus are not limiting, and wherein.

Figure 1:
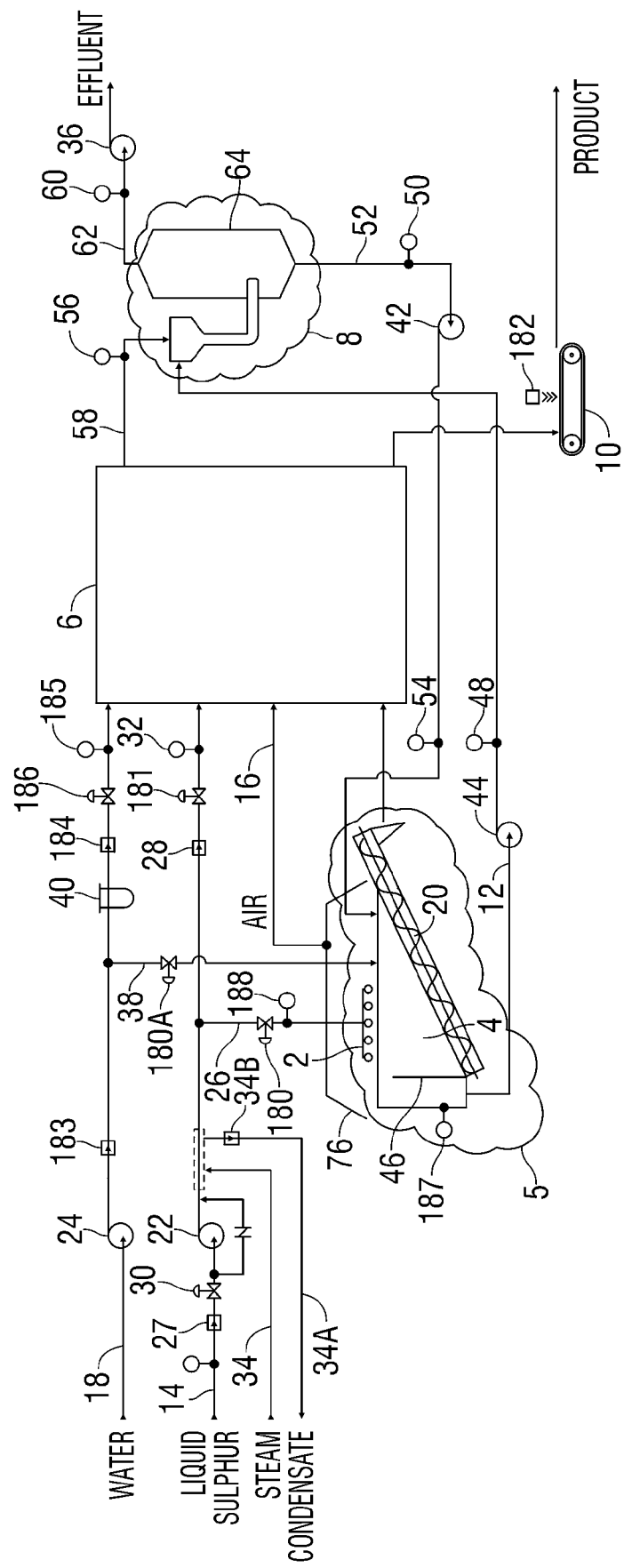
FIG. 1 is a schematic view of an exemplary system layout of sulfur seed generating spray nozzles with a cooling tank having a screw conveyor disposed with a sulfur granulating system, including a granulating drum, and a wet scrubber with cyclone, an air fan, a belt conveyor, and air, liquid sulfur, and water lines.

FIG. 2A is an isometric view of a sulfur seed generating system with a plurality of sulfur seed generating nozzles positioned with two sulfur seed header conduits, a spiral dewatering cooling tank with its top cover removed, and an internal screw conveyor.

FIG. 2B is a plan view of FIG. 2A.

FIG. 2C is an end view of FIG. 2A.

FIG. 2D is an elevational view of FIG. 2A.

FIG. 2E is an isometric view of ten sulfur seed generating nozzles attached with hoses to two sulfur seed header conduits.

FIG. 2F is a detail view of a sulfur seed nozzle of FIG. 2E.

FIG. 3A is an isometric view of a sulfur seed generating system disposed with a granulating drum system.

FIG. 3B is a plan view of FIG. 3A.

FIG. 3C is an end view of FIG. 3A.

FIG. 3D is an elevational view of FIG. 3A.

FIG. 4A is an isometric view of a portion of the inside of a granulating drum having a plurality of sets of segmented lifting flights, some of which are not aligned, and rib members attached between the inside surface of the drum and the flights.

FIG. 4B is similar to FIG. 4A but with one set of segmented lifting flights adjacent to the retaining ring at one end of the drum.

FIG. 4C is a detail view of a portion of the lifting flights and rib members in FIG. 4B.

FIG. 4D is an isometric detail view of three sets of rib members, with each rib member set supporting a set of three lifting flights, and one set of lifting flights parallel with the drum rotational axis and two of the three sets of lifting flight not parallel with the drum rotational axis.

FIG. 5 is a schematic cross-sectional detail view through a granulating drum of the gap between the lifting flights and the drum created by the rib members allowing for more of the finer grained particles to get needed enlargement from the sulfur spray nozzle and more of the coarser grained particles to move through the gap and avoid enlarging sulfur spray.

FIG. 6 is an isometric view of a portion of the inside of a granulating drum having a plurality of sets of segmented lifting flights some of which are not aligned, rib members attached between the inside surface of the drum and the flights, a liquid sulfur header line (nozzles not shown), and a water header line with a plurality of water nozzles.

FIG. 7 is a schematic partial cut away section elevational view of an alternative embodiment seed input end of a granulating drum having no lifting flights in that segment of the drum and a membrane attached with membrane attachment strips to the inside surface of the drum adjacent the retaining ring.

FIG. 7A is a cross-sectional view of the drum of FIG. 7 showing the membrane attached with the drum interior surface with the attachment strips and sulfur seeds falling into a seed bed.

DETAILED DESCRIPTION OF THE INVENTION

In FIG. 1, a sulfur seed generating system 5 comprises sulfur seed generating nozzles 2 (shown in detail in FIGS. 2E and 2F) and a cooling or a forming tank 4. The cooling tank 4 may be a spiral dewaterer tank with an angled bottom surface and a screw conveyor or auger 20, as shown in FIGS. 2A to 2D. Other cooling tank configurations are also contemplated. As shown in FIG. 1, liquid sulfur is pumped through a liquid sulfur supply line 14 with a liquid sulfur pump 22. The liquid sulfur may be diverted from the line 14 to a seed sulfur line 26 for delivery to tank 4 through sulfur seed nozzles 2 in spray (or droplet) form. The cooling tank 4 contains a liquid, such as water, to cool and solidify the molten sulfur spray. Other liquids, fluids or coolants are contemplated. Sulfur seeds formed by the interaction of the sulfur spray with the liquid settle in the tank 4. The sulfur seeds produced by the system 5 may be spherical in shape, typically between 0.1 and 2 mm in diameter and require further enlargement to satisfy SUDIC size specifications in order to obtain maximum commercial value.

Seeds produced in tank 4 may be transported to a granulating drum 6 by a screw conveyor or auger 20 or other transport means, such as a conveyor belt or a drag chain. The auger 20 may extend above the level of the cooling medium in tank 4 to allow entrained cooling medium to drain back to the tank 4. Dewatering of the seeds may minimize the potential for seeds to agglomerate together in the drum 6.

The sulfur line 14 provides sulfur to the drum 6 for enlarging the sulfur seeds into granules. An air line 16 provides air to the drum 6, where the air may be drawn first through cooling tank cover 76, positioned above tank 4, so as to collect any vapors that may evolve from the cooling liquid surface. A water line 18 connects to water pump 24 and a water filter 40 to provide water to the drum 6.

The sulfur supply line 14 may contain measurement devices (27, 28, 32) and an ON/OFF valve 30. The measurement devices, sensors or indicators (27, 28, 32) may measure temperature, pressure, and/or flow rate. The measurement device 32 located downstream of the intersection of the sulfur seed line 26 with the supply line 14 may monitor for over-pressure and under-pressure conditions that may cause a system shutdown. For all measurement devices, sensors or indicators in FIG. 1, even though a single device may be shown, the single device may be representative of more than one device, such as separate devices to measure temperature, pressure, flow rate, and/or other conditions. The output of all measurement devices shown in FIG. 1 may be interrogated by a control system, such as a computer, processor, control logic or microprocessor (not shown). The control system may display the measured value, modulate the process control valves and pumps, start up the system, and shut down the system. The sulfur supply line 14 and the sulfur seed line 26 may be steam jacketed to keep the liquid sulfur in the liquid state for transmission. Steam may be supplied to the jackets by steam line 34. Condensate produced as a result of heat transfer from the steam may be passed to condensate line 34A via steam trap 34B of conventional design.

The sulfur pump 22 insures that seed generating nozzles 2, which are disposed with the tank 4 and therefore outside of the drum 6, and sulfur granule enlargement nozzles (not shown) inside of the drum 6, are supplied with the needed sulfur flow rate. The sulfur pump 22 may be a positive displacement gear type pump typically equipped with a temperature sensor and a pressure safety valve. Other types of pumps are also contemplated. The sulfur flow rate to the drum may be measured by a measuring device 28, and the flow rate in the seed line 26 may be the difference between the flow rate measured by the device 27 and the flow rate measured by the device 28. The liquid sulfur flow rate to the drum may be controlled by varying the speed of the sulfur pump motor using a variable-frequency drive (VFD). The speed may be set by the control system in accordance with a flow rate provided by flow measuring device 27.

The liquid sulfur pressure in sulfur supply line 14 may be sufficient so that a pressure boost by the sulfur pump 22 is not necessary. The pump 22 may be bypassed with a loop and the pump 22 turned off by the control system if the sulfur flow rate is met but the sulfur pump motor amperes remain below a set value for a given period of time. When the pump 22 is in the OFF condition, the sulfur flow rate in the seed line 26 may be controlled by a flow control valve 180 in the seed line 26, and the flow rate to the drum 6 may be controlled by a flow control valve 181 in the supply line 14 downstream of the intersection with the seed line 26. The control system may turn the pump 22 to the ON condition if the sulfur flow rate remains below one or more pre-determined set points for a given period of time. With the pump ON, the control of the sulfur flow rate to the seed nozzles 2 outside the drum 6 and granule nozzles inside the drum 6 is affected by the sulfur pump VFD.

The granulating drum 6 enlarges seeds received from the cooling tank 4 to granules by building up the seed diameters with numerous coats of solidified liquid sulfur. The drum 6 may be sloped at an angle such that the elevation of the discharge end is lower than the inlet end. The slope angle may be from 0 to 5 degrees, although other angles are also contemplated. The flow, temperature, and pressure of the liquid sulfur to the drum 6 may be monitored and controlled. Sulfur pressure may serve as a diagnostic tool. Liquid sulfur temperature and sulfur granule temperature may assist the control system to determine the required cooling water flow rate to the drum 6 and the corresponding volume of effluent expelled by an exhaust fan 36. The drum 6 may be rotated with a VFD motor so as to allow the operator to vary the rotational speed of the drum. Drum torque values may be provided by motor ampere readings to inform the operator of any significant change in load. The drum 6 may be instrumented with a speed switch, which shuts down the system in the event that drum 6 stops rotating.

A belt conveyor 10 transports the finished granules to downstream storage and handling facilities. The conveyor 10 may be equipped with one or more measurement devices, including a motion detector, misalignment detector, and a manual pull cord. The system may be shut down based upon signals from any of the belt conveyor measurement devices. The temperature of the sulfur granules on the conveyor 10 may be monitored with a measurement device 182, which may be an Infrared (IR) instrument. Granule temperature may be received in the control system to control the flow rates of water to the drum 6 and effluent extracted by the fan 36.

Water supply line 18 supplies cooling water to the drum 6. Water delivered to the drum 6 is sprayed through water nozzles to effect the required cooling by evaporation. A seed water line 38 diverts from the supply line 18 and supplies make-up water to the cooling tank 4. The water pump 24 may be a multi-stage centrifugal pump capable of high discharge pressure. A recycle loop with a pressure safety valve from the pump discharge to pump suction may be utilized to protect the line 18 from overpressure. Other types of pumps are also contemplated. A flow measurement device 183 on the pump discharge side may provide the system's water requirements. Measurement devices (184, 185) in the line 18 may be used to measure pressure, temperature, and/or flow rate, for monitoring and control purposes. Make-up water to the tank 4 through the water line 38 may be needed to compensate for evaporation of warmed process water in a wet scrubber 8 and water exported to the drum 6 with the seeds. Make-up water may be modulated by control valve 180A in line 38 in response to the water level measured by a level measurement device 187 in the pump section of the cooling tank 4. A measurement device 188 may be located in the line 26 to monitor pressure and temperature for diagnostic and/or control purposes.

The required water flow to the drum 6 may be determined from several inputs and compared to the flow measured by a measurement device 183 on the discharge side of the water pump 24 in the water supply line 18. The output of measurement device 183 may be used by the control system to control the position of flow valve 186 in the water supply line 18, confirm water flow into the drum 6, and as permissive to start the drum 6. The water flow rate to the drum 6 may be closely estimated in relationship to the heat released by the sulfur solidification process. The computed water flow rate may be subject to error since the water introduced into the drum 6 as entrained moisture in the seed stream may not be measured. In this case, the flow valve in the line 18 may be manually trimmed if needed.

Air supplied through the air supply line 16 is drawn into the drum 6 and becomes progressively hotter and more humid as it migrates through the drum as a result of heat transfer from granules to water spray which results in the production of water vapor. The wet scrubber 8 of conventional design and operation captures and removes sulfur dust and sulfur mist present in the drum effluent moving out of the drum in the drum effluent line 58. Process water in the cooling tank 4 flowing over a cooling tank weir 46 may be pumped through the wet scrubber line 12 with a wet scrubber supply pump 44 to the wet scrubber 8. A measurement device 48 in the line 12 may provide temperature, pressure, and/or flow rate measurements.

The process water with sulfur dust particles collected in cyclone 64 of wet scrubber 8 flows through a line 52 to a cooling tank supply pump 42, which pumps the slurry back to the cooling tank 4 where the dust particles become entrained in seed sulfur droplets. The sulfur dust in the cooling tank may be captured by contact with molten sulfur droplets streaming down the cooling liquid column such that the dust particles become incorporated into the droplet, thereby being converted to a substantially spherical seed. It is also contemplated that the dust particles may be settled out in some other tank or system. The balance between water to and from the wet scrubber 8 may be maintained by controlling the water level at the bottom of the cyclone 64. A measurement device 50 in a cyclone slurry output line 52 may monitor water level. The water level may be maintained by VFD control of the pump 42 motor speed. A measurement device 54 in the line 52 on the discharge side of the pump 42 may measure temperature and pressure. It is anticipated that all of the heat transferred to the fluid in tank 4 as a result of seed generation may be rejected by evaporation in the wet scrubber such that the temperature of the fluid in the line 52 may be cooler than the temperature of the fluid in the line 12. The line 52 may include a heat exchanger (not shown) to further cool the fluid returning to the tank 4. Heat absorbed by the heat exchanger may be rejected using a suitable cooling device such as a cooling tower or aerial cooler.

A measurement device 56 in the drum effluent line 58 to the wet scrubber 8 may measure temperature. A measurement device 60 in a cyclone air output line 62 connected with the fan 36 may measure temperature. The differential pressure across the wet scrubber 8 may also be measured. The fan 36 moves air through the system at a flow rate controlled by a VFD on the fan motor. The fan 36 may be protected by a vibration switch. The effluent flow rate required to maintain a desired sulfur product temperature may depend on several parameters, including ambient dry bulb temperature, ambient humidity, liquid sulfur temperature, liquid sulfur flow rate, sulfur product temperature, water flow rate and temperature, and drum effluent temperature and humidity. The humidity of the drum effluent may be derived from the several inputs because direct measurement may be unreliable at high temperature and humidity conditions. The fan 36 VFD may be manually trimmed to accommodate any uncertainty in the determined humidity.

Turning to FIGS. 2A to 2D, the seed generating system 5 is shown with the cooling tank 4. In this embodiment, the cooling tank 4 is a spiral dewaterer tank with a screw conveyor or auger 20. Spiral dewaterer tanks are available from Metso Corporation of Helsinki, Finland, among others. The tank 4 is disposed on tank support structure or skid 80A for ease of transportation to a different location and set up for quick operation. The tank 4 is filled with a cooling liquid 72, such as water. Other liquids, fluids and coolants are contemplated. The liquid 72 temperature may be 65° C. to 75° C., or approximately 70° C., although other temperatures are also contemplated. The height of weir 46 in the tank 4 may be adjusted to change the depth of the water column for the seed droplets to solidify in the tank. It is contemplated that water will overflow the weir 46 since the water may be continuously circulated.

The tank cover or hood 76 (shown in FIG. 3A) positioned above tank 4 has been removed. First and second sulfur seed header conduits (70A, 70B) disposed with the tank 4 are in fluid communication with sulfur seed spraying nozzles 2, and are shown in detail in FIGS. 2E and 2F. Returning to FIGS. 2A to 2D, it is contemplated that the tank 4 may be deep enough so that sulfur seed droplets may be solidified by the time the droplets reach the floor of the tank. The tank depth may be 96 inches (2.4 m) at the deep end and 31 inches (0.8 m) at the shallow end; the tank width may be 78 inches (2 m) at the wide end and 24 inches (0.6 m) at the narrow end, although other depths and widths are also contemplated.

Figure 2A:
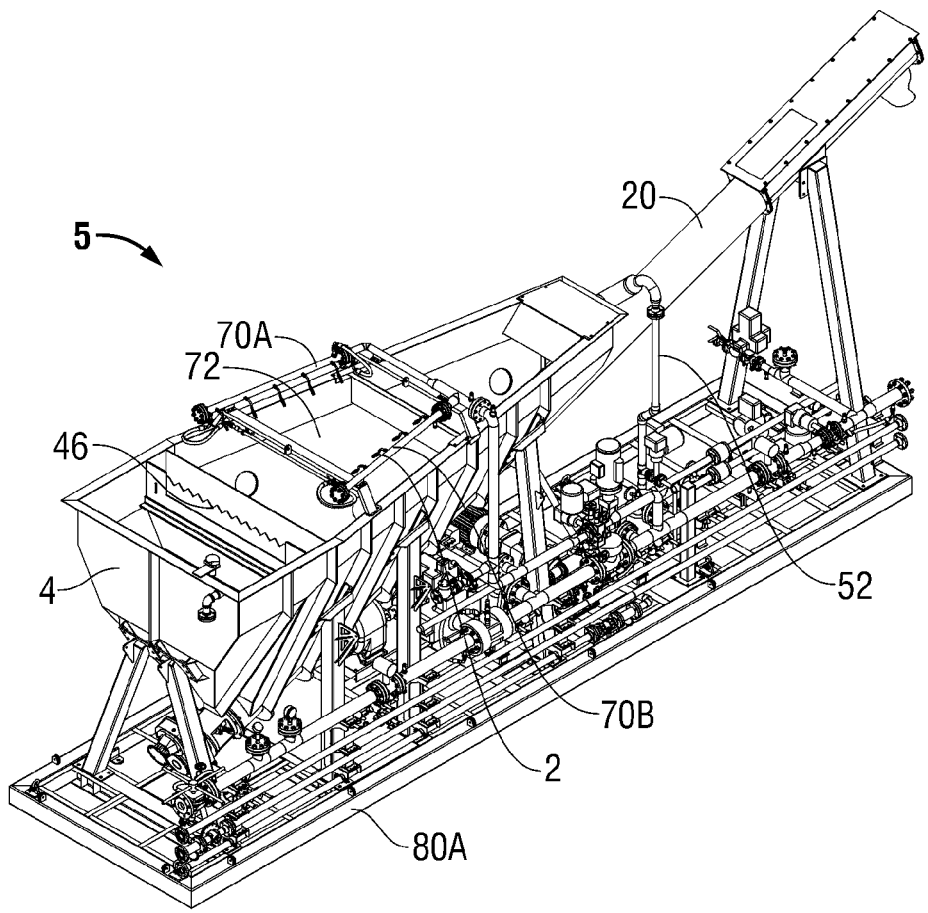
Figure 2B:
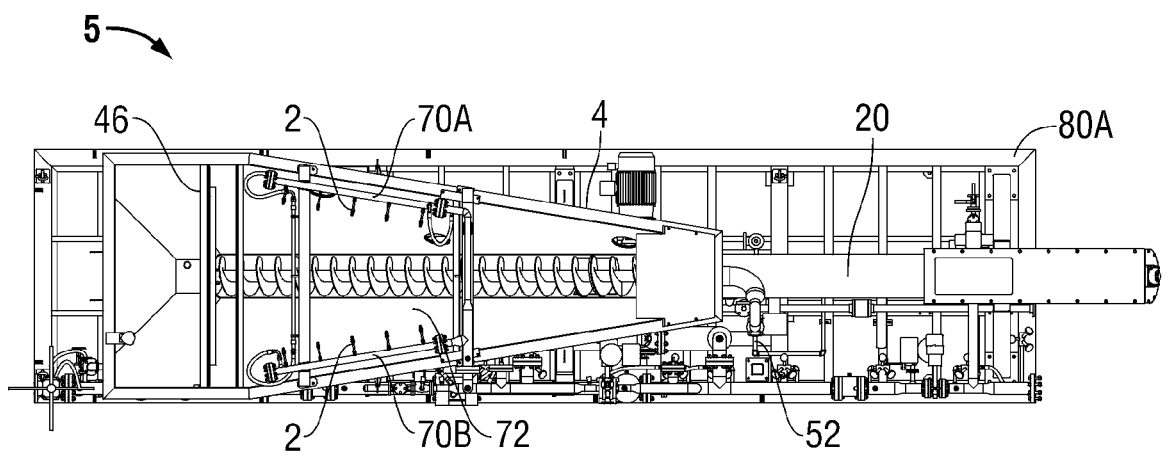
Figure 2C:
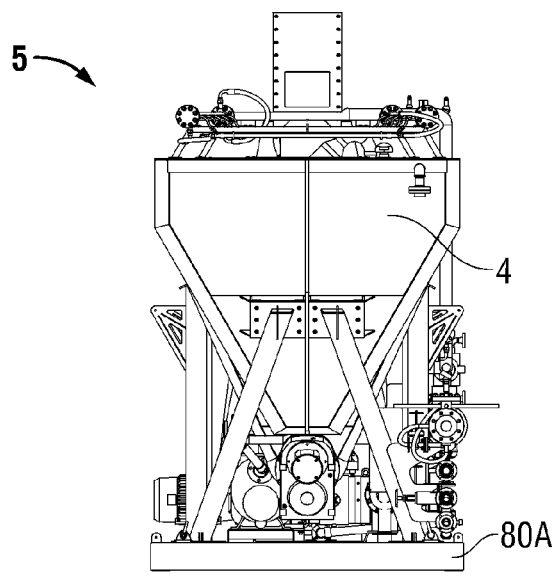
Figure 2D:
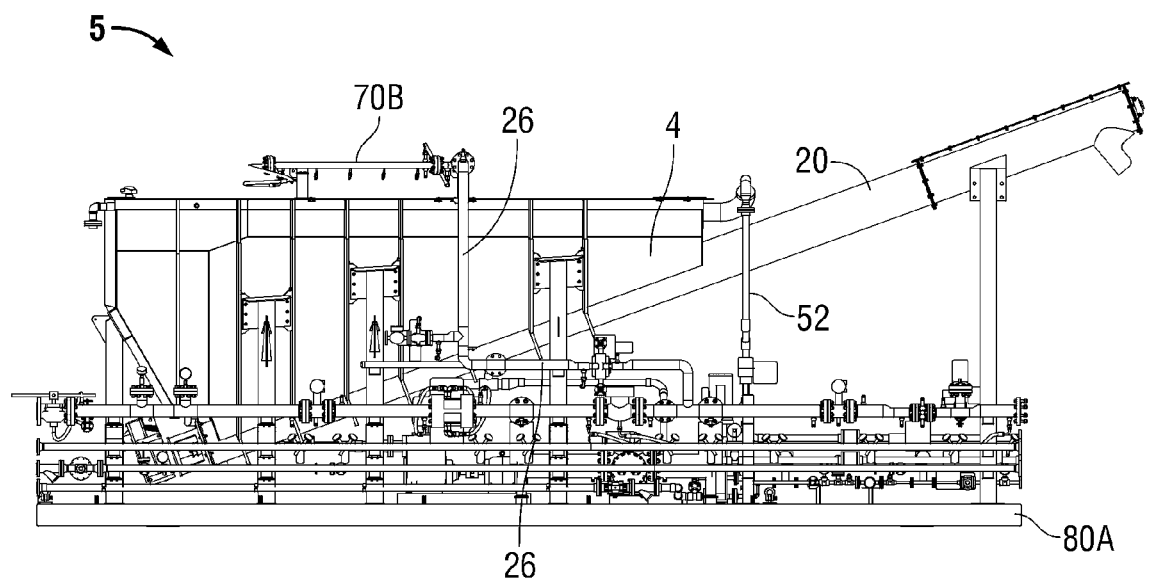
Figure 3A:
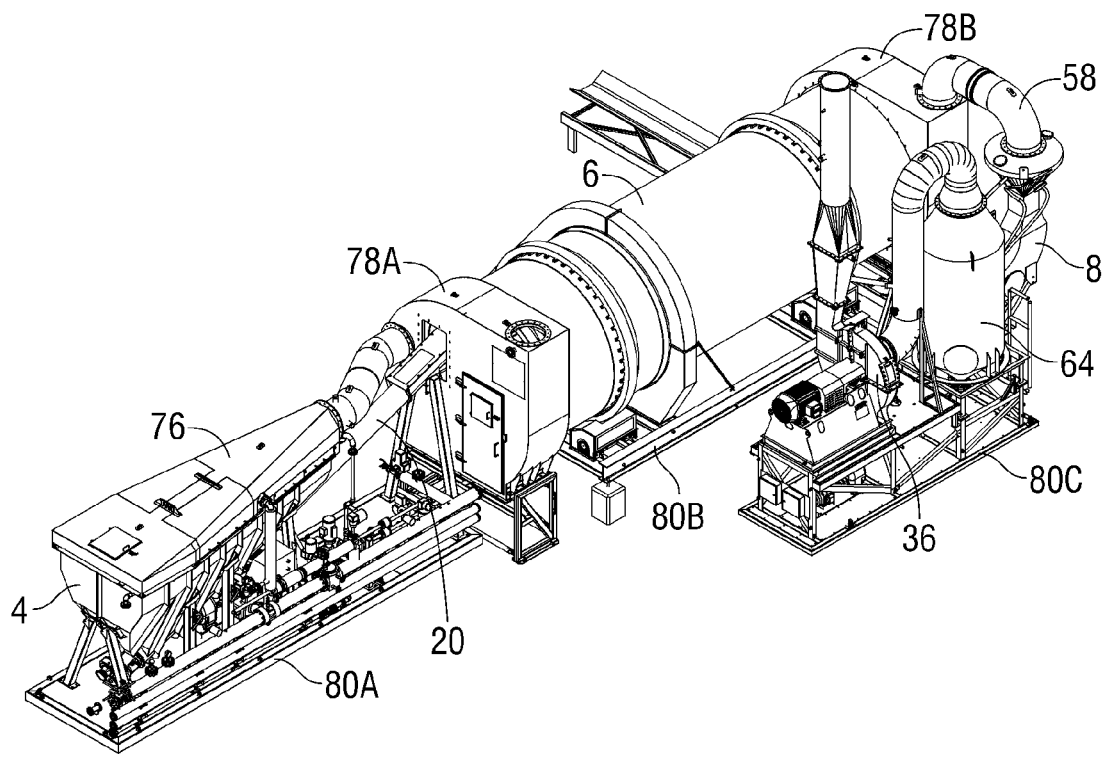
Figure 3B:
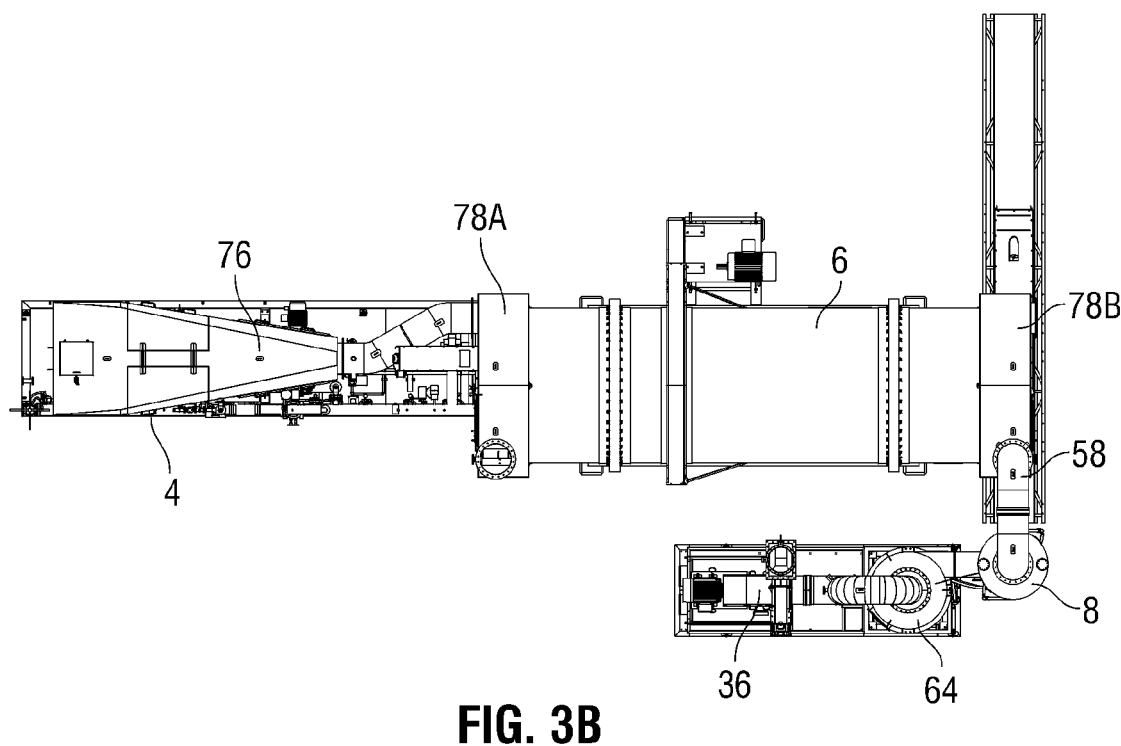
Figure 3C:
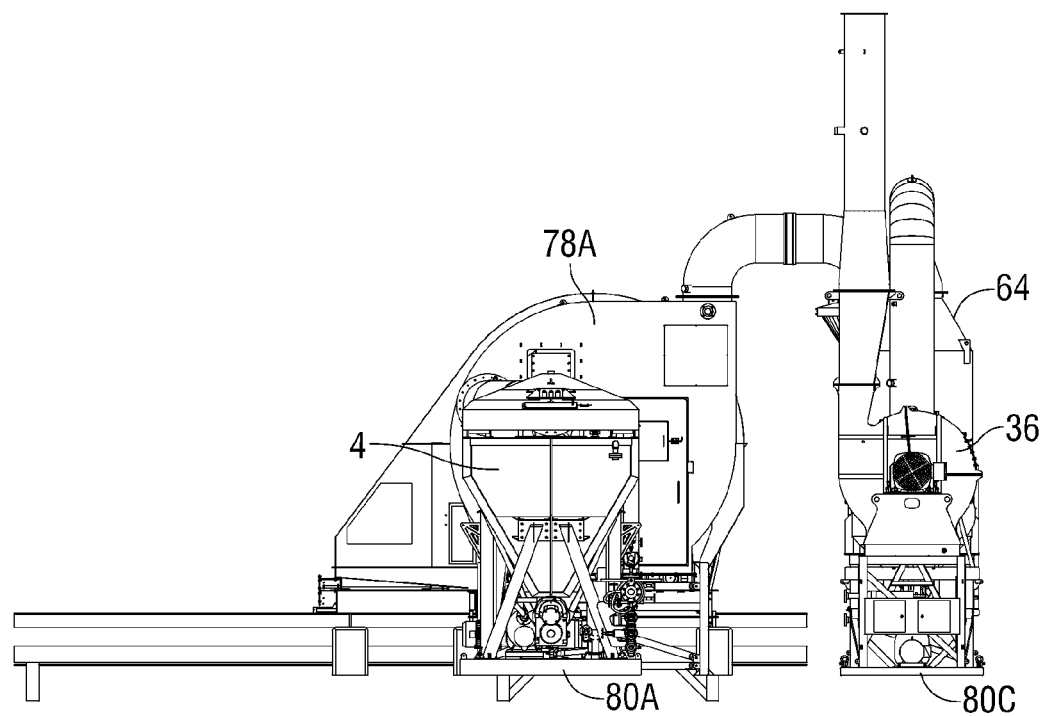
Figure 3D:
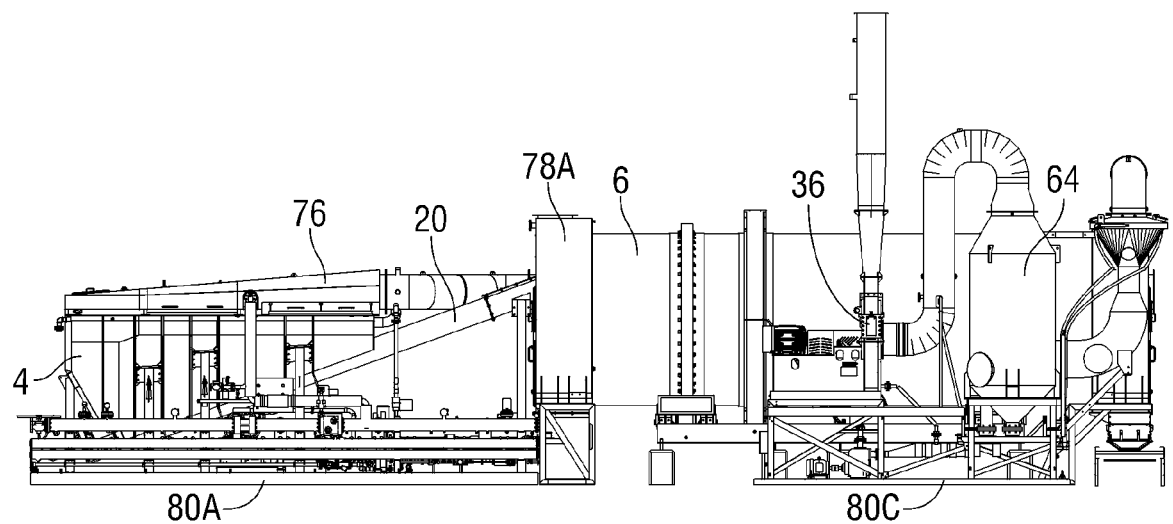

The cyclone slurry output line 52 shown in FIG. 1 transports a water and sulfur particle mixture from the drum 6 and the wet scrubber 8 into the tank 4 as shown in FIGS. 2A, 2B and 2D. The tank 4 may be used both to generate seeds from sulfur delivered by the nozzles 2 and to remove sulfur dust received from the line 52 in the manner described above with FIG. 1. It is also contemplated that the sulfur dust removal process and the seed generation process may be separated. The liquid flow in the tank 4 is generally from the right side to the left side as the tank is viewed in FIGS. 2A and 2D. In FIG. 2B, the sulfur seed nozzles 2 are attached in fluid communication with a first sulfur seed header conduit 70A and a second sulfur seed header conduit 70B. In FIG. 2D, the sulfur seed supply line 26 from FIG. 1 is shown for connection with the second header conduit 70B.

In FIG. 2E, ten sulfur seed nozzles 2 are attached with the first header 70A and the second header 70B with ten sulfur seed tubings or hoses 74. The tubing 74 may be insulated. Other attachment means are also contemplated, including attaching the nozzles 2 directly with the header conduits (70A, 70B). A header input conduit 71 may be in fluid communication with the sulfur seed supply line 26 of FIG. 1. The nozzles 2 may be aimed or disposed at a certain angle from horizontal toward the liquid 72 in the tank 4, such as 45° down from horizontal, although other angles are also contemplated. The nozzles 2 may be rotated to different angles. The nozzles 2 may be disposed at a certain distance from the liquid 72 in the tank 4. The distance may be 12 inches (30.5 cm), although other distances are also contemplated. The nozzles may be spaced approximately 12.4 inches (314 mm) apart, although other spacing is also contemplated. The nozzles 2 may be conventional fluid spray nozzles such as are available from Spraying Systems Company of Carol Stream, Ill., among others.

The orifice size and spray angle of the nozzles 2 may be selected/configured for optimum seed production. It is contemplated that the equivalent diameter of the orifice may be 4.4 mm, although other equivalent orifice diameters are contemplated, such as from 1.4 to 5.8 mm. It is contemplated that the spray angle may be 65°, although other angles are contemplated from 25° to 90°. The contemplated nozzle 2 may correspond with a 6550 flat fan nozzle available from Spraying Systems Company, although other types and manufacturers are also contemplated. The sulfur pressure under which nozzle 2 operates will vary in accordance with the number, type, and size of nozzles 2 that are required to realize the required flow rate. A spray pressure from 5 psi to 200 psi is contemplated.

The nozzles 2 may be selected with a flat fan spray (tapered, even, and/or deflected), a conical spray including hollow cone and/or full cone, and/or a deflected spray, although other spray types are also contemplated. Different spray tips may be installed to change the spray pattern and droplet size distribution. It is also contemplated that the nozzles 2 attached with the headers (70A, 70B) may each have different orifices, spray angles, angles aimed from horizontal, and/or other characteristics. Although ten sulfur seed nozzles 2 are shown in FIG. 2E, it is contemplated that other numbers of the nozzles 2 may be used, such as from four to sixteen nozzles 2.

The pressure and/or flow rate of the sulfur moving through the sulfur seed nozzles may be adjusted by the control system to increase or decrease the particle size and amount of sulfur seeds produced. The nozzle orifice size, spray angle, and/or other characteristics may also be selected to change the seed size and production rate.

It is contemplated that ten (10) sulfur seed nozzles such as shown in FIG. 2E may be used with 314 mm (12.4 inch) spacing and a 45° angle downward from horizontal. Other configurations and distances are also contemplated. Each seed nozzle may have a flat fan pattern with a 65° spray angle, a 4.4 mm equivalent orifice, and 45 psi liquid sulfur pressure. Other configurations, pressures and sizes are also contemplated. A model 6550 nozzle from Spraying Systems Company gives a contemplated spray angle and size. It is contemplated that seeds produced with a 6550 flat fan nozzle oriented at 45° downward from horizontal and liquid sulfur pressure of 15 psi may produce about 97.7% of seeds by weight that are smaller than 2.36 mm, and about 98.4% of seeds by weight that are larger than 0.3 mm, so that 96% of the seeds may be between 2.36 and 0.3 mm. It is contemplated that at 45 psi liquid sulfur pressure, the size distribution may shift to 98% of seeds by weight less than 2.0 mm and 98% of seeds by weight larger than 0.15 mm, so that 96% of seeds may be between 2.0 and 0.15 mm. Other distributions and sizes are also contemplated.

The sulfur nozzles used to enlarge seed in the drum may produce a flat spray pattern having a tapered or even edge. A plurality of sulfur nozzles may be used on a spray header or manifold such that the spray pattern of adjacent nozzles may overlap in order to provide uniform coverage across the falling curtains in the axial direction. The spray pattern may have spray angles from 15° to 110°. A nozzle producing a flat even spray pattern may provide a uniform spatial density of droplets throughout the entire flat spay pattern. It may have spray angles from 15° to 110°. The thin rectangular spray pattern may provide uniform coverage with minimal overlap between adjacent nozzles. A flat even spray pattern may be produced by a deflected type nozzle. The spray pattern of medium sized drops is formed by liquid flowing from a round orifice over the deflector surface. The spray angles may be from 15° to 150°. The nozzle may have a large free passage design though the round orifice that reduces clogging. The narrow spray angles provide higher impact, while the wide angle versions produce a lower impact.

In FIGS. 3A to 3D, the cooling tank 4 is in fluid communication with the granulating drum 6; the wet scrubber 8 and the cyclone 64 are in fluid communication with the drum 6; and the fan 36 is in fluid communication with the cyclone 64. The tank 4 is disposed on the tank support structure or skid 80A, drum 6 is disposed on the drum support structure or skid 80B, and the cyclone 64 and the wet scrubber 8 are disposed on the cyclone support structure or skid 80C, all for ease of transportation to a different location or quick set up for operation. A cooling tank top cover 76 is disposed with the tank 4 so that the sulfur seed nozzles 2 are not visible. The screw conveyor 20 may move seeds to the drum 6 having a first plenum or breach 78A and a second plenum or breach 78B. The drum effluent line 58 in FIG. 1 moves the air, water vapor and sulfur particle mixture to the wet scrubber 8, which captures and removes the sulfur dust to the fluid exiting the wet scrubber in line 52. The drum 6 may have a diameter of approximately 10 feet (3 m) and a length of approximately 30 feet (9 m), although other sizes are contemplated. Sulfur granules discharged from drum 6 drop onto belt conveyor 10 shown in FIGS. 3A, 3B and 3C.

Figure 4A:
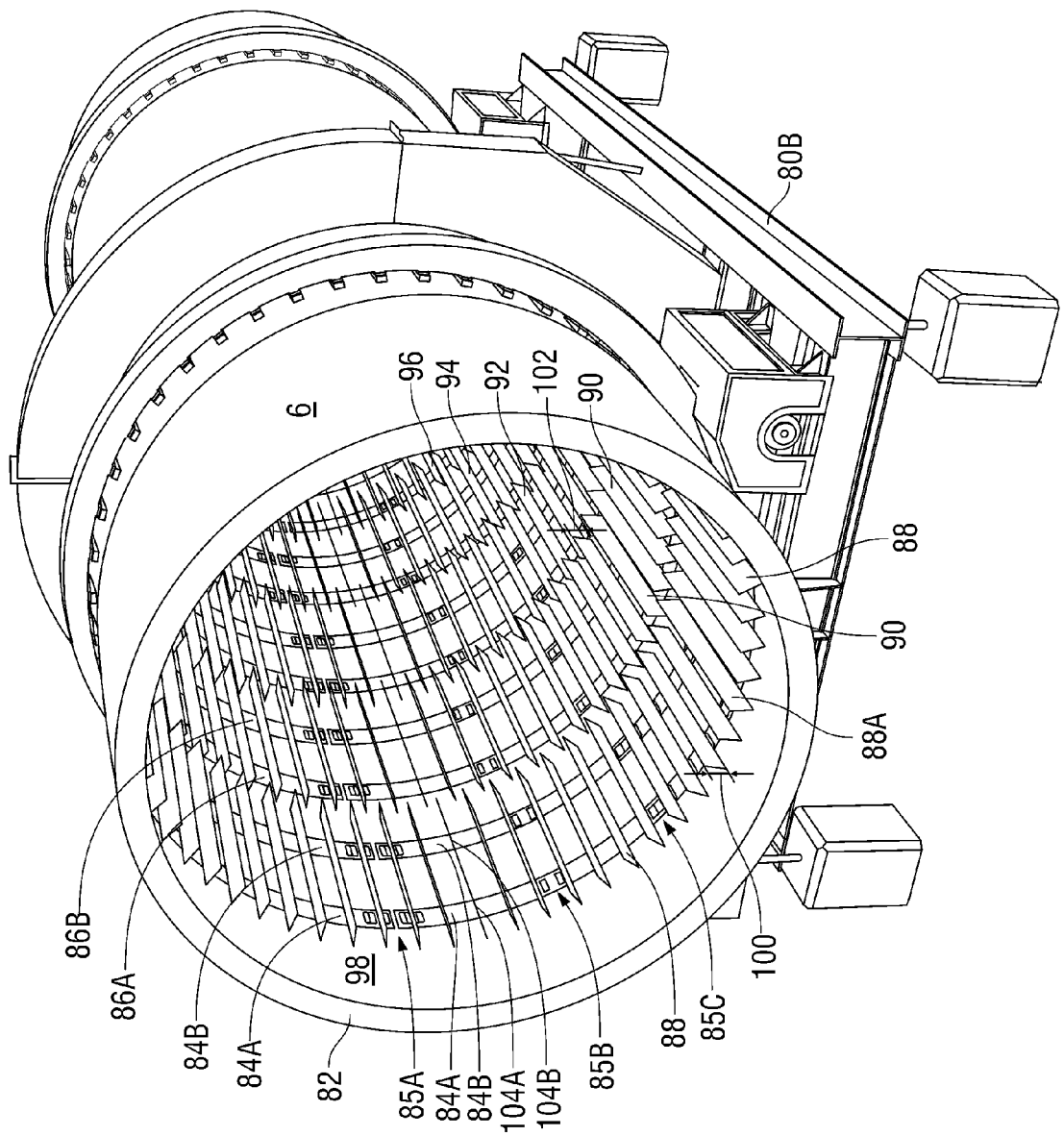

Turning to FIG. 4A, the drum 6 is shown without the first plenum 78A. A first retaining ring 82 minimizes spillage from the drum 6, and another similar second retaining ring may be positioned at the opposite end of the drum 6. The first retaining ring 82 may have a height of five inches (12.7 cm), although other heights are contemplated. A first set of lifting flights 88 is disposed with an interior surface 98 of the drum 6. First set rib members (84A, 84B) may be disposed between the first flights 88 and the drum interior surface 98. There may be a plurality of segmented sets of the first set rib members (84A, 84B) disposed around the interior surface 98 of the drum 6. The sets of rib members (84A, 84B) are segmented in that each set is shorter than the circumference of the interior surface of the drum. Each rib member (84A, 84B) may have a curved length equaling approximately ¼ of the inside circumference of the drum 6, such as covering 90° of the 360° circumference. However, other lengths are also contemplated. The segmentation of the rib members allows for easy assembly, maintenance and transport.

Each segmented set of rib members (84A, 84B) may support a plurality of flights 88, such as from 1 to 20, with 14 being the preferred amount. The rib member 84A may be attached with the drum 6 at least at two locations, such as at a first connection point 85A and a second connection point 85B. As shown in FIG. 4A, the rib member 84A is preferably attached with drum 6 at four locations: first connection point 85A, second connection point 85B, third connection point 85C, and a fourth connection point (hidden from view by flight 88A). It is contemplated that each connection point, such as first connection point 85A and second connection point 85B, may have a bolt welded to the interior surface of drum 6 extending radially into the drum 6 and passing through a hole in the rib member (84A, 84B). A nut may be used to secure the rib member (84A, 84B) with the drum at each connection point (85A, 85B).

Figure 4B:
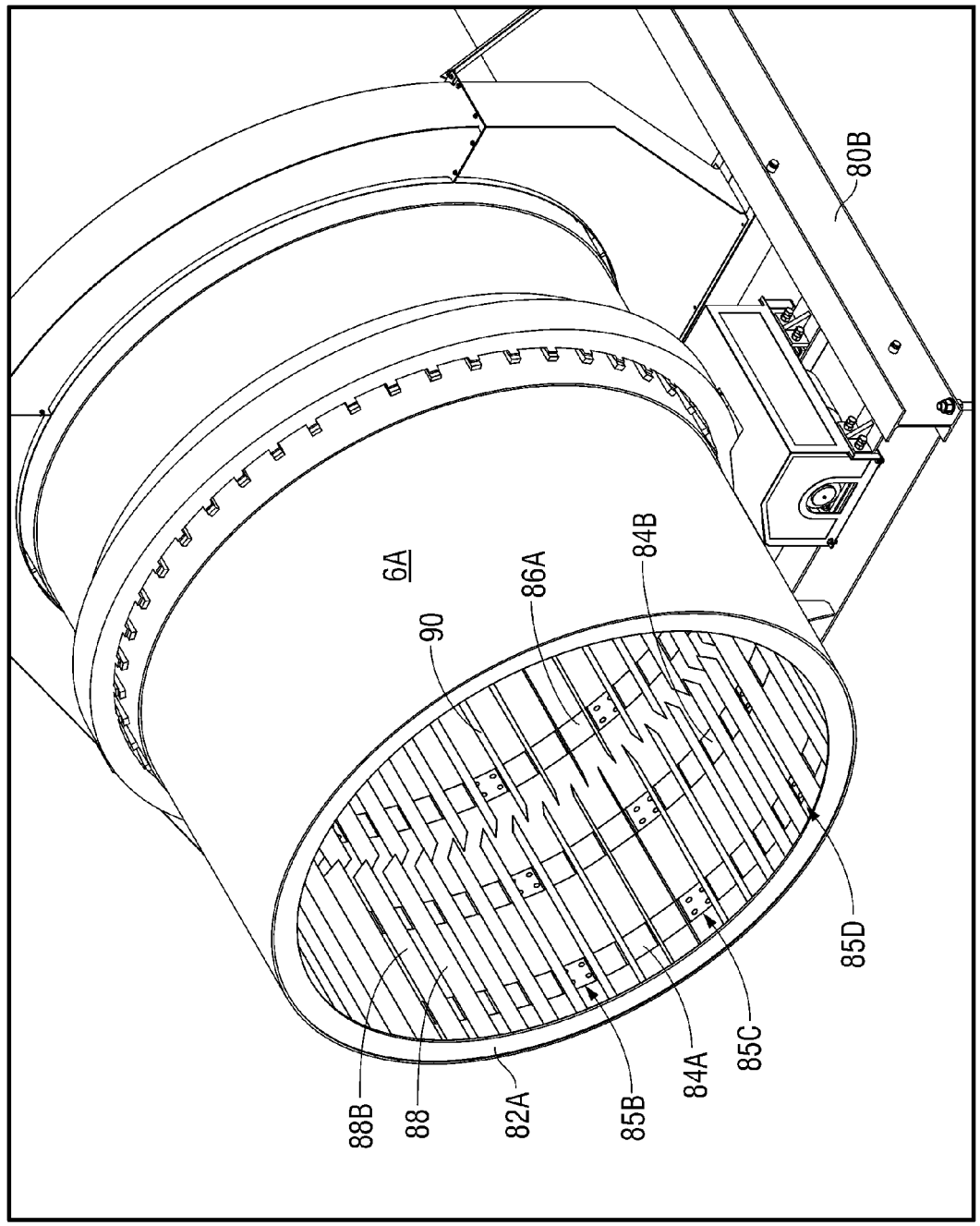
Figure 4C:
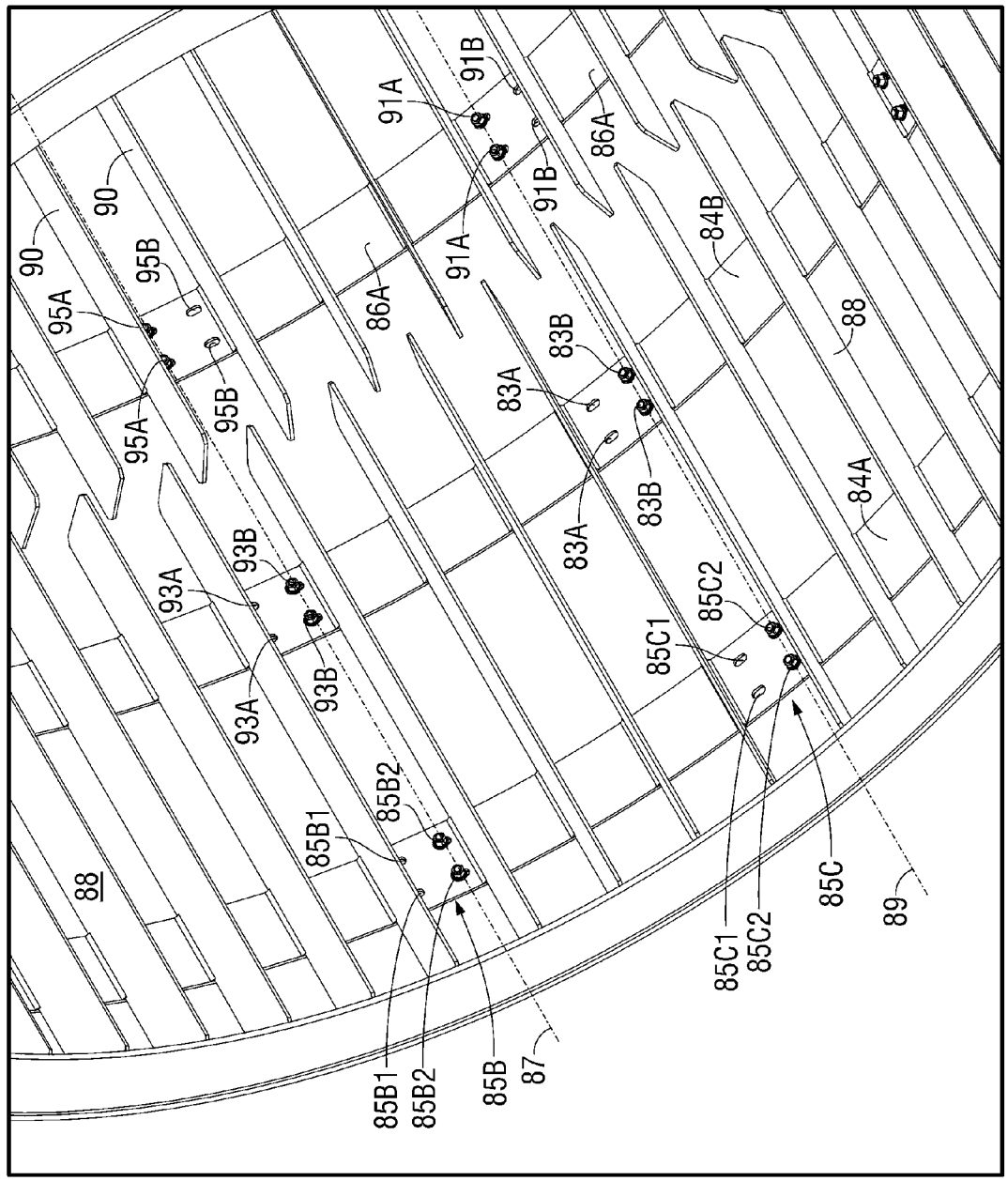

FIGS. 4B and 4C show the connection points of the rib members with the drum interior surface. FIG. 4B is similar to FIG. 4A except that first flights 88 of a drum 6A are positioned with one end adjacent to a first retaining ring 82A. The retaining rings (82, 82A) may have heights at least as large as the heights of the flights (88, 90, 92, 94, 96). A rib member 84A in FIG. 4B is connected with the interior surface of the drum 6A at a first connection point (hidden from view behind flight 88B), a second connection point 85B, a third connection point 85C, and a fourth connection point 85D. As shown in FIG. 4C, the second connection point 85B of rib member 84A has two holes 85B1 and two holes 85B2. Bolts (not shown) are centered on reference line 87 through holes 85B2. Bolts (not shown) are also positioned through the two holes 93B in the rib member 84B and the two holes 95A in a rib member 86A along a reference line 87. The first set of lifting flights 88 is not in alignment with the second set of lifting flights 90. The two holes 95B in the rib member 86A allow for alignment of the first set of lifting flights 88 with the second set of lifting flights 90 by moving rib member 86A so that holes 95B are positioned along the reference line 87 and bolts are positioned through the holes 95B rather than the holes 95A.

A third connection point 85C of rib member 84A has two holes 85C1 and two holes 85C2. Bolts (not shown) are centered on reference line 89 through holes 85C2. Bolts (not shown) are also positioned through the two holes 83B in rib member 84B and the two holes 91A in rib member 86A along reference line 89. Again, the two holes 91B in rib member 86A allow for alignment of the first set of lifting flights 88 with the second set of lifting flights 90 by moving rib member 86A so that holes 91B are positioned along reference line 89 and bolts are positioned through holes 91B rather than holes 91A. All other rib members and flights may be similarly disposed with the drum 6.

As shown in FIG. 4C, each rib member (84A, 84B, 86A) may have two pairs of holes at each connection point, such as two holes 85B1 and two holes 85B2 at second connection point 85B of rib member 84A, to allow for the staggering of adjacent flight segments. The rib members may have a pair of matching holes spaced apart by half the distance between adjacent flights of a flight segment. A staggered configuration may be effected by attaching the ribs to the bolts on the drum wall using alternating hole pairs, e.g. the top pair for the first set of flights, the bottom pair for the second set of flights, the top pair for the third set of flights, and so on. A non-staggered alignment may be obtained by aligning the top pair (or bottom pair) of holes in all the flight segments with the bolts. There may be more than one bolt and nut used at each connection point, such as connection points 85A and 85B. Other connections are also contemplated.

Returning to FIG. 4A, it is contemplated that flights 88 may be welded to the rib members (84A, 84B), although other connections are also contemplated. It is also contemplated that there may be no rib members (84A, 84B), and that the first flights 88 may be attached directly with the interior surface 98 of the drum 6. As can now be understood, the rib members (84A, 84B) allow for ease in handling and/or replacement of the first flights 88. As shown with FIG. 5 and discussed therewith in detail below, the thickness of rib members (84A, 84B) advantageously provides a gap between the first flights 88 and the surface 98 through which larger seeds and/or granules may move as the drum 6 rotates.

In FIG. 4A, a second set of lifting flights 90 is also disposed with the interior surface 98 of the drum 6. Second set rib members (86A, 86B) may be disposed between the second flights 90 and the drum 6 in a similar configuration as the first set rib members (84A, 84B). It is also contemplated that there may be no rib members (86A, 86B), and that second flights 90 may be attached directly with the interior surface 98 of the drum 6. A third set of flights 92, a fourth set of flights 94, and a fifth set of flights 96 are also shown attached with respective rib members in a similar manner. The flights (88, 90, 92, 94, 96) are not continuous through the length of the drum 6 but are segmented as they are all shorter than the length of the drum 6.

The flights (88, 90, 92, 94, 96) may be 4 feet (1.216 m) in length, although other lengths are also contemplated. The flights (88, 90, 92, 94, 96) are not aligned, but are offset from each other. It is also contemplated that one or more sets of flights (88, 90, 92, 94, 96) may be aligned, such as the first flights 88, the third flights 92, and all other odd number of flights.

The even numbers of sets of flights may also be in alignment. Although the sets of rib members, such as the first rib members (84A, 84B) and the second rib members (86A, 86B), may have the same thickness, it is also contemplated that different sets of rib members may have different thicknesses. The non-aligned or staggered flights may advantageously increase air circulation and cooling in the drum.

The flights (88, 90, 92, 94, 96) are disposed with the drum interior surface 98 on lines parallel with the longitudinal or rotational axis of the drum 6, such as the first flight 88 attached with the first rib members (84A, 84B) at respective locations (104A, 104B). It is also contemplated that one or more sets of flights (88, 90, 92, 94, 96) may be disposed with the drum interior surface 98 on lines not parallel with the longitudinal axis of the drum 6, such as shown in FIG. 4D.

Figure 4D:
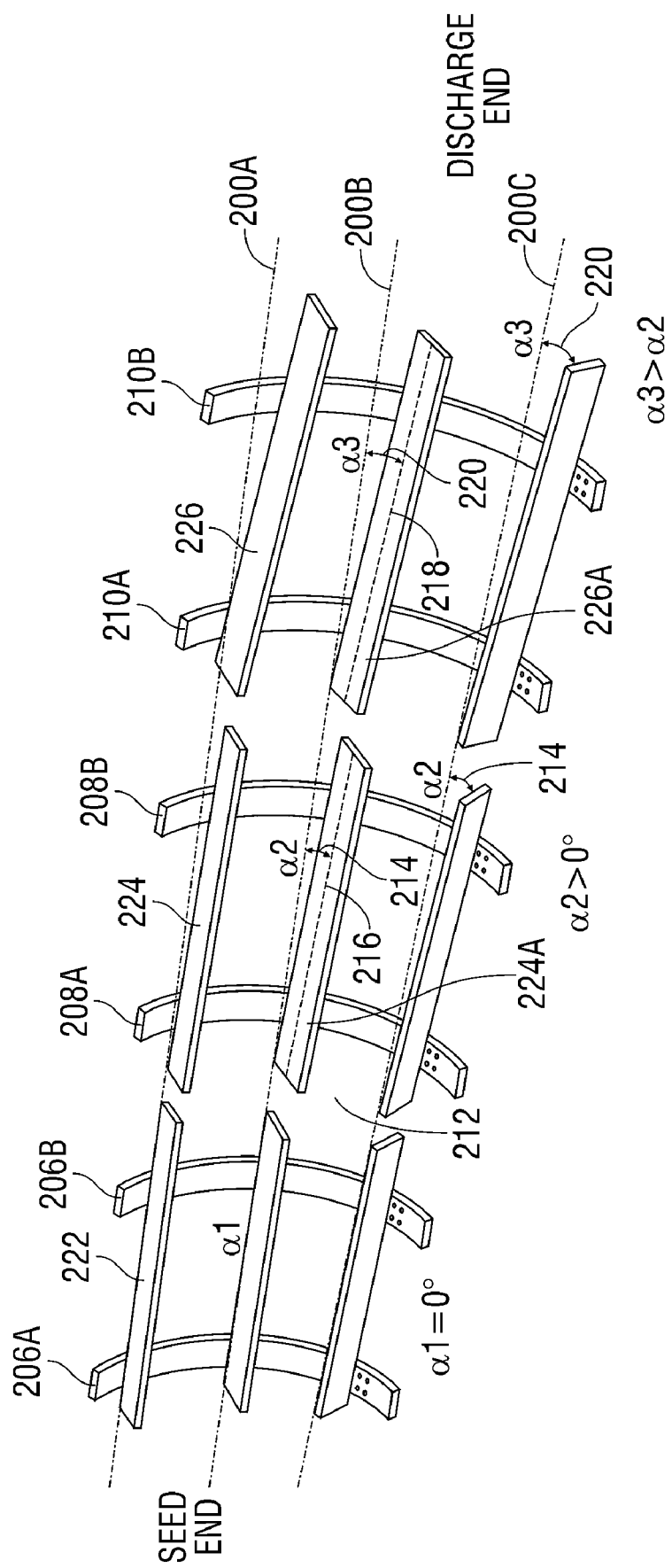

In FIG. 4D, first set of rib members (206A, 206B), second set of rib members (208A, 208B), and third set of rib members (210A, 210B) are attached with an interior surface 212 of a granulation enlargement drum, such as drum 6. First set of flights 222 are attached with first set of rib members (206A, 206B), second set of flights 224 are attached with second set of rib members (208A, 208B), and third set of flights 226 are attached with third set of rib members (210A, 210B). Only three sets of rib members and flights are shown in FIG. 4D for clarity, although more sets of rib members and flights are contemplated. In relative relation to each other, first flights 222 are positioned closest toward the input end of the drum, and third flights 226 are positioned closest to the output end of the drum.

Reference lines (200A, 200B, 200C) are shown for illustrative purposes and are parallel with the drum rotational axis. First set of flights 222 are attached with first set of rib members (206A, 206B) on lines coincident with or parallel to reference lines (200A, 200B, 200C). Second set of flights 224 are attached with second set of rib members (208A, 208B) on lines not parallel with reference lines (200A, 200B, 200C). Using second flight 224A with second flight centerline 216 for illustrative purposes, second flight centerline 216 is disposed at angle 214 from reference line 200B. Likewise, the other second flights 224 may be disposed at angle 214 from their nearest reference line (200A, 200B, 200C). Similarly, third set of flights 226 are attached with third set of rib members (210A, 210B) on lines not parallel with reference lines (200A, 200B, 200C). Using third flight 226A with third flight centerline 218 for illustrative purposes, third flight centerline 218 is disposed at angle 220 from reference line 200B. It is contemplated that angle 220 may be greater than angle 214. Although only three sets of flights are shown, it is contemplated that there may be more sets of flights, with each successive flight from the input end toward the output end of the drum disposed at an larger angle from the reference line. As can now be understood, a lifting flight may be disposed in a plane that only intersects the drum axis at one location.

The angled flight attachment lines may allow for progressively faster movement of the particles from the input end of the drum 6 to the output end utilizing a screw type action. The angled flight attachment lines may change the distance that sulfur granules advance down the drum for each drum rotation. It is contemplated that the angle of attachment may get progressively larger from the input end to the output end of the drum 6. This may maintain a constant height of the granule bed in the drum in the axial direction, without which the depth of seeds and granules in the bed at the bottom of the drum sometimes may significantly exceed the height of the flights. This condition prevents the flights from lifting the majority of the seeds and granules into the airspace where they may be effectively cooled.

The angled or screwed flights may advantageously increase the exposure of hot seeds and granules to the cooling atmosphere by minimizing the height of the bed of seeds and granules in the drum. The cooler product tends to be less friable and less susceptible to "caking" or "agglomerating" in storage. The spiral flights move more granule volume as more volume is produced. This keeps the bed depth at a constant height (slightly above the flights) all the way down the drum. The result is that virtually all granules are kept in circulation to the curtains where they are effectively cooled. Without volumetric acceleration, the extra volume may simply increase the bed depth so more of the bed simply tumbles without being lifted, making cooling less effective.

Returning to FIG. 4A, height 100 of first flights 88 may be the same as or different from height 102 of second flights 90 or any other of the flights. It is contemplated that the flights (88, 90, 92, 94, 96) may be 5 inches (12.7 cm) in height, although other heights are also contemplated. It is also contemplated that one or more of the flight sets may have angled heights so that their height is not constant across the length of the flights. The angled flights may allow progressively larger volume of particles to be lifted into the airspace from the input end of the drum 6 to the output end. As the bulk volume of granules increases in the axial direction, the deeper flights volume is lifted into the airspace at that particular point where it can be cooled. It is contemplated that the angles may get progressively larger from the input end to the output end of the drum. It is also contemplated that a flight may not be contained in a single plane, such as being curved or bent. It is contemplated that all of the described embodiments of the flights and rib members may be used in any combination or permutation. By varying the configuration of the flights, it is possible to maintain a level amount of sulfur granules along the bottom of the drum 6 as the drum 6 rotates.

Figure 5:
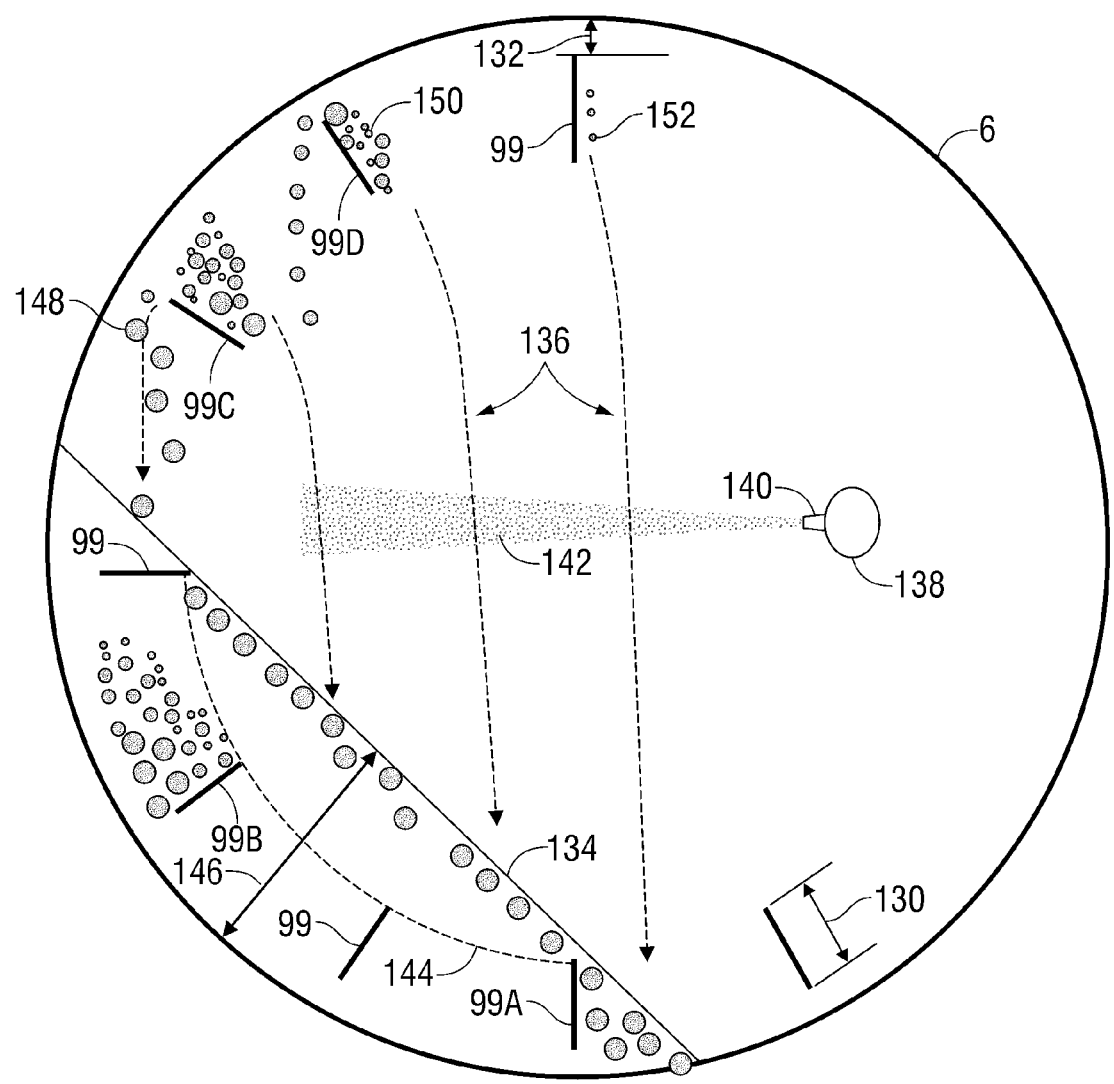

Turning to FIG. 5, the lifting flights (99, 99A, 99B, 99C, 99D) are spaced apart from the drum 6 by the thickness of rib members (not shown), providing a gap 132 between the flights (99, 99A, 99B, 99C, 99D) and the drum 6 interior surface. It is contemplated that the rib thickness may be in a range from ¼ inch (0.64 cm) to 2 inches (5.1 cm), although other thicknesses and gaps 132 are also contemplated. As the drum 6 rotates clockwise, the flights (99, 99A, 99B, 99C, 99D) elevate seeds and granules from a bed 134. There may be a natural stratification of granules in the bed 134 through a thickness 146, with course particles found near the exposed surface and grading to fines adjacent to the drum interior surface. It is contemplated that the flight 99A first fills with coarse granules sliding down the bed 134. The course granules may slide to the approaching flight 99A, which then fills with progressively smaller granules and seeds. The height 130 of flights (99, 99A, 99B, 99C, 99D) limits their lifting capability to an outer boundary line 144. Pre-emergent flight 99B may have coarse grains near the gap 132, and finer grains near the outer boundary line 144.

The flight 99C may have coarse grains 148 fall though the gap 132 as the flight 99C begins to discharge so that a majority of coarse grains 148 may not be exposed to a sulfur spray 142 from a spray nozzle 140 attached with a sulfur header conduit 138 in the drum 6. This is advantageous because it allows for more efficient enlargement of the smaller particles, which need more enlargement than the larger particles. Finer grained particles 150 from the flight 99D may discharge into falling curtains 136 toward the sulfur spray nozzle 140 and are the most likely to be sprayed. Fine particles such as a particle 152 may be in the falling curtain 136 closest to the spray nozzle 140. The falling curtain 136 closest to the nozzle 140 may consist mostly of small grains.

Figure 6:
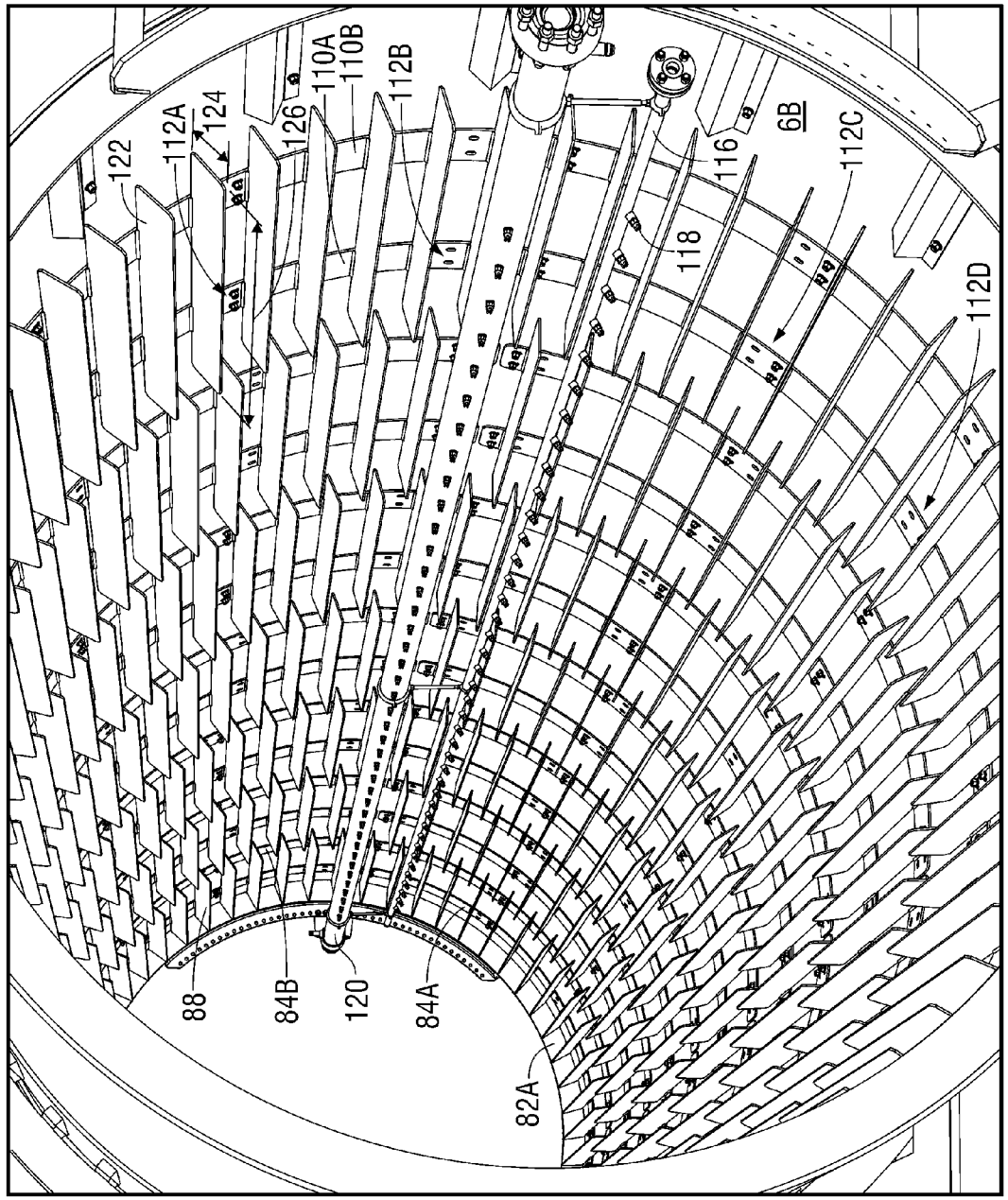

Turning to FIG. 6, a drum sulfur header line 120 and a drum water line 116 are disposed in the interior of the granulating drum 6B. The sulfur supply line 14 from FIG. 1 may be in fluid communication with the drum sulfur header line 120, and the water supply line 18 from FIG. 1 may be in fluid communication with the drum water line 116. The drum sulfur line 120 has a plurality of sulfur spray nozzles for spraying and enlarging sulfur seeds that are not shown. The spray nozzles may be spaced approximately 8 inches (20 cm) apart, although other spacing is also contemplated. It is contemplated that the drum sulfur spray nozzles may be aimed substantially horizontally, although other angles are also contemplated.

The drum sulfur line 120 may have the capability to rotate to allow spray to be directed downward, upward, or horizontally into the falling curtains. This in particular facilitates the use of a deflected spray sulfur nozzle. The drum sulfur line 120 may be steam jacketed. The drum sulfur line 120 may be disposed approximately 1 foot (30.5 cm) from the nearest location of the drum 6B interior surface, although other positions are also contemplated. The drum sulfur line 120 may be 30 feet (9.1 m) long inside the 30 foot long drum 6B with additional one foot extensions outside of the drum at both ends to attach to a supporting structure. Other dimensions are also contemplated.

The drum water line has a plurality of water spray nozzles 118. It is contemplated that the water nozzles 118 may be angled downward, such as 45° from horizontal, although other angles are also contemplated. Similar to FIGS. 4A and 4C, exemplary sets of flights 122 and rib members (110A, 110B) are shown, with the flights 122 having lengths 126 and heights 124, and a rib member 110A attached with the drum 6B at a first connection point 112A, a second connection point 112B, a third connection point 112C, and a fourth connection point 112D.

Figure 7A:
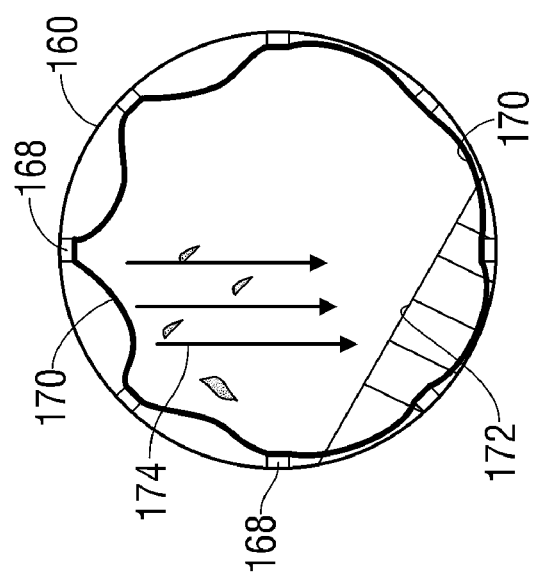
Figure 7:
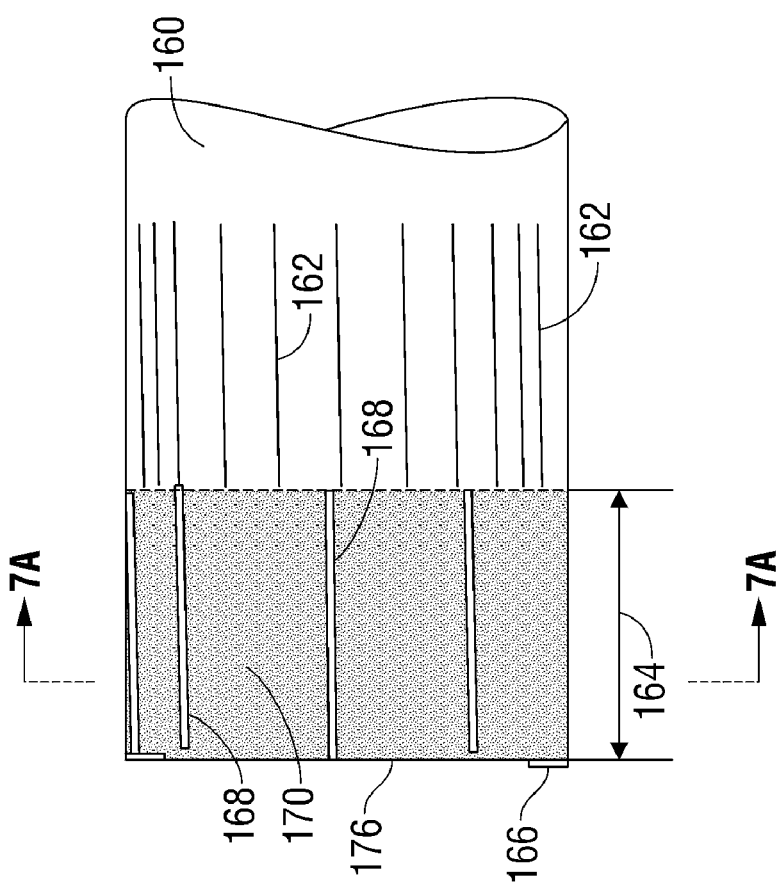

In FIG. 7, an alternative embodiment is shown for a seed input end 176 of a granulating drum 160. Flights 162 may begin at a distance 164 from the seed input end 176 of the drum 160, so that there may be no flights in distance 164. The distance 164 may be approximately two feet (0.6 m) to four feet (1.2 m), although other distances are also contemplated. A retaining ring 166 may be at a drum end 176. As best shown in FIG. 7A, a membrane 170 may be attached to the interior surface of drum 160 in the distance 164 with membrane attachment strips 168. The membrane 170 may be a flexible silicone based membrane, although other types of materials for the membrane 170 are also contemplated. The membrane attachment strips may be conventional dimensional steel such as channel stock. It is contemplated that wet seeds may enter the drum end 176 and be in a tumbling seed bed 172, in which seeds may be held together by moisture. As the drum 160 rotates, dislodged seed clumps may fall, such as in curtains 174, to the bed 172. As can now be understood, the membrane 170 allows for seeds that may have a tendency to clump from moisture to potentially be separated and dried before being elevated by lifting flights 162. Normal airflow without water spray through this zone may dry out the seeds before entering the normal flighted section of the drum 160.

The embodiments described above may allow control of the size distribution and production rate of seeds, produced outside the granulating drum, that enable a one pass enlargement cycle through the drum (no seed recycle) at a high production rate (1500 tonne per day or more). This capability may eliminate the need for an output screen and underside recycle conveyor (lower capex and opex). The system may provide for an increase in unit production rate and improved product quality enabled by improved cooling of granules (i.e. enhanced exposure of granules to the sweep air that itself is kept cool by water evaporation). This may be achieved by non-aligned or staggered lifting flights. This may provide for a more tortuous path for airflow around the falling curtains.

A drum revolutions per minute (RPM) may be selected such that the falling curtains fill approximately 75% or more of the granulating drum volume. Flights attached with rib members or attached directly to the drum on lines not parallel with the drum rotational axis provide for a "screwed flights" design to move the bed to the discharge end at a progressively faster rate, corresponding to sulfur mass introduced as spray, so that the amount of granules tumbling in the bed and not being cooled may be kept to a minimum. A substantially constant product temperature may be maintained in respect to changes in key operating variables, such as sulfur production rate, the temperature of the liquid sulfur and the sulfur product, and ambient temperature and humidity, among others. This may be achieved by adjusting the airflow rate through the drum by varying the speed of the fan. The fan speed may be determined by the control system or processor using inputs from the various instruments.

There may be improved control of the particle size distribution of the product by incorporating a gap between the flights and the drum shell that allows preferential spraying of the finer granules and seeds as a result of discharging the coarse granules in the curtains most distal from the sulfur spray nozzles. Since the seed particles may be wet, there is a possibility that the seeds may stick to and clog up lifting flights that originate at the seed input end of the drum. This may be mitigated by removing the flights in the first two to four feet of the drum and installing a flexible membrane around the inside wall of the drum. The membrane, which may be non-rubber, may flex as it rotates to the top of the drum, allowing the clumps to fall back into the bed. Normal airflow without water spray through this zone may dry out the seeds before entering the normal flighted section of the drum.

The system shown schematically in FIG. 1 may be disposed on support structures or skids for ease of construction or transportation, such as support structures (80A, 80B, 80C) in FIGS. 2A-2D, 3A-3D, and 4A-4B. The system may substantially eliminate the conveyors and other structures of the prior art extending from the output end of the drum to the input end of the drum that are required for the recycling of undersized sulfur particles back through the drum. Further, the modular nature of the system allows for easy set up and operation. Also, the production of sulfur seeds externally to the drum 6 may allow for the use of lower pressures in the drum 6, and better optimization of granule production. The separation of the seed production from the granule production also may allow for better optimization of seed production. Although the preferred use of the method and system is for sulfur (or sulphur), it is also contemplated that the method and system, and any of the embodiments and components, may be used for converting other molten liquids to solid seeds or granules, such as asphalt. Although the exemplary embodiment of the method and system passes the molten sulfur through water, other fluids or cooling medium besides water, as known in the art, but novel when used herein, are contemplated and may be used.

The foregoing disclosure and description of the invention are illustrative and explanatory thereof, and various changes in the details of the illustrated apparatus and system, and the construction and the method of operation may be made without departing from the spirit of the invention.

What is claimed is:

1. A system for converting molten sulfur into sulfur seeds used for making sulfur granules, comprising:
   a cooling tank storing a liquid;
   a first spray nozzle disposed with said cooling tank;
   the molten sulfur sprayed by said first nozzle into said liquid; and
   sulfur seeds formed by the interaction of the sulfur with the liquid.

2. The system of claim 1, wherein the cooling tank is a spiral dewaterer tank having an angled bottom surface and a screw conveyor.

3. The system of claim 2, wherein the sulfur seeds are transported out of the cooling tank with said screw conveyor.

4. The system of claim 3, further comprising:
   a granulating drum for enlarging sulfur seeds into granules positioned adjacent to the cooling tank, wherein the sulfur seeds are transported with said screw conveyor to said drum.

5. The system of claim 4, further comprising:
   a drum effluent line in fluid communication between said granulating drum and said cooling tank configured to transport a mixture of liquid and sulfur dust from said drum to said cooling tank.

6. The system of claim 1, further comprising:
   a sulfur header conduit disposed with said cooling tank;
   wherein said first spray nozzle and a second spray nozzle are in fluid communication with said conduit.

7. The system of claim 6, wherein said first spray nozzle and said second spray nozzle are positioned a certain distance from the nearest location of said cooling tank liquid.

8. The system of claim 6, wherein said first spray nozzle and said second spray nozzle configured to rotate.

9. The system of claim 6, wherein said first spray nozzle and said second spray nozzle rotated a certain angle downward from horizontal for spraying toward said cooling tank liquid.

10. The system of claim 1, wherein said first nozzle forms a flat fan spray.

11. The system of claim 1, wherein said first nozzle forms a cone spray.

12. The system of claim 1, wherein said first nozzle forms a deflected spray.

13. The system of claim 1, wherein said liquid is water.

14. The system of claim 4, wherein said cooling tank and said drum are supported on skid structures for transporting.

15. A method for converting molten sulfur into sulfur seeds used for enlargement into sulfur granules, comprising the steps of:
   spraying the molten sulfur through a first spray nozzle into a liquid in a cooling tank;
   settling the sulfur through the liquid; and
   forming sulfur seeds by the interaction of the sulfur with the liquid.

16. The method of claim 15, further comprising the step of:
   conveying the seeds out of the cooling tank to a sulfur granulating device.

17. The method of claim 16, further comprising the step of:
   enlarging the sulfur seeds into sulfur granules in said granulating device.

18. The method of claim 17, further comprising the steps of:
   moving a mixture of liquid and sulfur dust from said granulating device to said cooling tank; and
   removing the sulfur dust from said mixture in said cooling tank.

19. The method of claim 18, further comprising the steps of:
   contacting the sulfur dust with some of the sulfur settling through said liquid; and
   forming sulfur seeds by the interaction of the sulfur with the sulfur dust.

20. The method of claim 16, wherein the cooling tank is a spiral dewaterer tank having an angled bottom and a screw conveyor, and wherein the step of conveying performed with said screw conveyor.

21. The method of claim 15, wherein a sulfur header conduit disposed with said cooling tank, and wherein said first spray nozzle and a second spray nozzle are in fluid communication with said conduit, and further comprising the steps of:

flowing the molten sulfur through said conduit; and
spraying the molten sulfur through said first nozzle and said second nozzle.

22. The method of claim 21, further comprising the step of: spraying the molten sulfur from a certain distance above the nearest location of said cooling tank liquid.

23. The method of claim 15, further comprising the step of: spraying the molten sulfur from said first nozzle and said second nozzle at a certain angle from horizontal.

24. The method of claim 15, wherein the spraying is in a flat fan shape.

25. The method of claim 15, wherein the spraying is in a cone shape.

26. The method of claim 15, wherein the spraying is deflected.

27. The method of claim 15, wherein the liquid is water.

28. A granulating apparatus for enlarging sulfur seeds into sulfur granules, comprising:
a drum having a drum length and a drum longitudinal axis, wherein said drum configured to rotate about said drum axis;
a first set of a plurality of lifting flights disposed in the interior of said drum for lifting sulfur seeds and granules when said drum rotates, wherein each flight having a first flight length; and
a second set of a plurality of lifting flights disposed in the interior of said drum for lifting sulfur seeds and granules when said drum rotates, wherein each flight having a second flight length;
wherein said first flight length is less than said drum length; and
wherein said second flight length is less than said drum length.

29. The apparatus of claim 28, wherein said first set of flights are not in alignment with said second set of flights.

30. The apparatus of claim 28, further comprising:
a first set of rib members for attachment between the interior surface of the drum and said first set of lifting flights, wherein said first rib members having a first thickness; and
a second set of rib members for attachment between the interior surface of the drum and said second set of lifting flights, wherein said second rib members having a second thickness;
wherein said first thickness configured to provide a first gap between said interior drum surface and said first set of lifting flights through which sulfur seeds and granules may move; and
wherein said second thickness configured to provide a second gap between said interior drum surface and said second set of lifting flights through which sulfur seeds and granules may move.

31. The apparatus of claim 30, wherein each flight of said first flight set attached with said first set of rib members along a line parallel with said drum axis, and wherein each flight of said second flight set attached with said second set of rib members along a line parallel with said drum axis.

32. The apparatus of claim 30, wherein each flight of said first set of flights attached with said first set of rib members along a line not parallel with said drum axis, and wherein each flight of said second set of flights attached with said second set of rib members along a line not parallel with said drum axis.

33. The apparatus of claim 30, wherein said rib first thickness and said rib second thickness substantially equal.

34. A system for enlarging sulfur seeds into sulfur granules using a seed generator and a granulating drum, comprising:
said seed generator for producing sulfur seeds from a first liquid sulfur;
a transport mechanism for moving the sulfur seeds from said generator to the granulating drum;
said drum having a drum length and a drum longitudinal axis, wherein said drum configured to rotate about said drum axis and comprising:
a plurality of lifting flights disposed in the interior of said drum for lifting the sulfur seeds when said drum rotates; and
a nozzle for spraying a second liquid sulfur on the sulfur seed as the sulfur seeds fall from the plurality of lifting flights as said drum rotates to produce the sulfur granules.

35. The system of claim 34, wherein the seed generator comprises a water tank and a liquid sulfur spraying nozzle.

36. The system of claim 34, further comprising mounting skids for supporting said seed granulator and said drum.

37. A transportable granulating apparatus for enlarging sulfur seeds into sulfur granules, comprising:
means for creating said sulfur seeds from a liquid sulfur;
means for transferring said sulfur seeds to a granulating means;
said granulating means for enlarging said sulfur seeds into said sulfur granules; and
means for supporting and transporting said means for creating, said means for transferring and said granulating means.

38. The system of claim 37, further comprising means for transferring non-sulfur granules from said granulating means to said means for creating.

* * * * *

EX PARTE REEXAMINATION CERTIFICATE (19th)
Ex Parte Reexamination Ordered under 35 U.S.C. 257

United States Patent
Lang et al.

(10) Number: US 8,329,072 C1
(45) Certificate Issued: Jan. 27, 2015

(54) METHOD AND SYSTEM FOR GENERATING SULFUR SEEDS AND GRANULES

(75) Inventors: Leslie L. Lang, Calgary (CA); Paul R. Larson, Calgary (CA); Jamsheed P. Irani, Calgary (CA); Sergio A. De Paoli, Calgary (CA); Casey J. Metheral, Calgary (CA)

(73) Assignee: Martin Product Sales LLC, Kilgore, TX (US)

Supplemental Examination Request:
No. 96/000,049, Mar. 7, 2014

Reexamination Certificate for:
Patent No.: 8,329,072
Issued: Dec. 11, 2012
Appl. No.: 12/953,512
Filed: Nov. 24, 2010

(51) Int. Cl.
*B29B 9/00* (2006.01)
*C01B 17/02* (2006.01)
*B29B 9/12* (2006.01)

(52) U.S. Cl.
CPC ............ *C01B 17/0216* (2013.01); *B29B 9/12* (2013.01)
USPC ..................... 264/7; 118/303; 264/13; 425/7

(58) Field of Classification Search
None
See application file for complete search history.

(56) References Cited

To view the complete listing of prior art documents cited during the supplemental examination proceeding and the resulting reexamination proceeding for Control Number 96/000,049, please refer to the USPTO's public Patent Application Information Retrieval (PAIR) system under the Display References tab.

*Primary Examiner* — Terrence Till

(57) ABSTRACT

Sulfur (or sulphur) spray nozzles disposed with a cooling tank spray liquid molten sulfur into the cooling liquid in the tank. Solid sulfur seeds are formed in the cooling liquid and settle in the tank. The cooling tank may be a spiral dewaterer tank that has a screw conveyor at the bottom of the tank that moves the seeds to a granulating drum for enlargement into sulfur granules. The cooling tank may also be used to capture and remove sulfur dust from a slurry of sulfur dust and water recycled from the granulating drum. The sulfur dust in the cooling tank may be captured by contact with molten sulfur droplets streaming down the cooling liquid column such that the dust particles become incorporated into the droplet, thereby being converted to seed. The granulating drum may be equipped with two or more sets of segmented lifting flights. The sets of flights may not be in alignment. The flights may be spaced apart from the inside surface of the drum with segmented rib members. The rib members may allow for the movement of sulfur seeds and granules between the flights and the inside surface of the drum as the drum rotates.

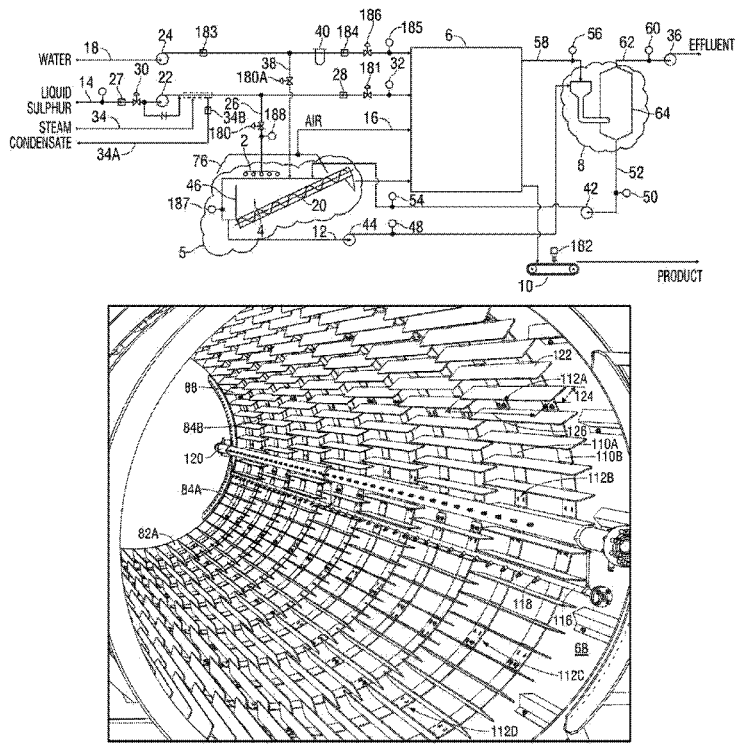

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-27 and 34-38 is confirmed.

Claims 28 and 29 are cancelled.

Claim 30 is determined to be patentable as amended.

Claims 31-33, dependent on an amended claim, are determined to be patentable.

30. [The] *A granulating for enlarging sulfur seeds into sulfur granules, comprising:*

*a drum having a drum length and a drum longitudinal axis, wherein said drum configured to rotate about said drum axis;*

*a first set of a plurality of lifting flights disposed in the interior of said drum for lifting sulfur seeds and granules when said drum rotates, wherein each flight having a first flight length; and*

*a second set of a plurality of lifting flights disposed in the interior of said drum for lifting sulfur seeds and granules when said drum rotates, wherein each flight having a second flight length;*

*wherein said first flight length is less than said drum length; and*

*wherein said second flight length is less than said drum length,*

*the* apparatus [of claim 28.] further comprising:

a first set of rib members for attachment between the interior surface of the drum and said first set of lifting flights, wherein said first rib members having a first thickness; and a second set of rib members for attachment between the interior surface of the drum and said second set of lifting flights, wherein said second rib members having a second thickness;

wherein said first thickness configured to provide a first gap between said interior drum surface and said first set of lifting flights through which sulfur seeds and granules may move; and wherein said second thickness configured to provide a second gap between said interior drum surface and said second set of lifting flights through which sulfur seeds and granules may move.

* * * * *